(12) United States Patent
Naegle

(10) Patent No.: US 6,819,337 B2
(45) Date of Patent: Nov. 16, 2004

(54) INITIALIZING A SERIES OF VIDEO ROUTERS THAT EMPLOY SOURCE-SYNCHRONOUS SIGNALING

(75) Inventor: Nathaniel David Naegle, Pleasanton, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 316 days.

(21) Appl. No.: 10/195,857

(22) Filed: Jul. 15, 2002

(65) Prior Publication Data

US 2003/0058247 A1 Mar. 27, 2003

Related U.S. Application Data

(63) Continuation-in-part of application No. 09/894,617, filed on Jun. 27, 2001.
(60) Provisional application No. 60/214,713, filed on Jun. 28, 2000.

(51) Int. Cl.$^7$ .................................................. G09G 5/00
(52) U.S. Cl. ....................................................... 345/723
(58) Field of Search ................................ 345/723, 504; 711/167; 710/310, 58; 713/322, 400, 401; 725/119; 348/705, 515, 537

(56) References Cited

U.S. PATENT DOCUMENTS 6,147,695 A   11/2000  Bowen et al.

OTHER PUBLICATIONS

Alan Dare Perspectives on Image Quality in the Silicon Graphics® Infinite Reality Graphics System, Feb. 8, 2000, 5 pages.

*Primary Examiner*—Matthew C. Bella
*Assistant Examiner*—Dalip K. Singh
(74) *Attorney, Agent, or Firm*—Meyertons Hood Kivlin Kowert & Goetzel, P.C.; Jeffrey C. Hood; Mark K. Brightwell

(57) ABSTRACT

A video routing system including video routers VR(0), VR(1), ..., VR($N_R$-1) coupled in a linear series. Each video router in the linear series successively operates on a digital video stream. Each video router provides a synchronous clock with its output video stream so a link interface buffer in the next video router can capture values from the output video stream in response to the synchronous clock. Each video router buffers a common clock to generate a local output clock. The output clock is used as a read clock to read data out of the corresponding link interface buffer. The output clock is also used to generate the synchronous clock that is transmitted downstream. To initialize the series, reset is sequentially removed from each video router starting from the first video router after the common clock has stabilized.

11 Claims, 22 Drawing Sheets

Assign one of the link interface buffers in each video router of the linear series to form a first video path, and assign one of the pixel clock signals to drive output from each link interface buffer of the first video path
910

Initialize the read and write pointers in each link interface buffer of the first video path
930

Sequentially remove reset condition from the link interface buffers of the first video path after the assigned pixel clock signal has stabilized
940

INITIALIZING A SERIES OF VIDEO ROUTERS THAT EMPLOY SOURCE-SYNCHRONOUS SIGNALING

This application is a continuation-in-part of copending U.S. patent application Ser. No. 09/894,617 filed on Jun. 27, 2001, entitled "Flexible Video Architecture for Generating Video Streams", which claims priority to Provisional Application No. 60/214,713 filed on Jun. 28, 2000. This copending application Ser. No. 09/894,617 is hereby incorporated by reference in its entirety.

BACKGROUND OF THE INVENTION

1. Field of the Invention

This invention relates generally to the field of graphics hardware and, more particularly, to a system for generating a digital video stream using a series of video routers.

2. Description of the Related Art

Within a digital system, it is often difficult to distribute a central clock signal to multiple locations with sufficiently low skew so as to establish a synchronous clock domain. This is especially true as clock frequencies increase and skew become a larger proportion of the total clock cycle time. Thus, there exists a need for a system capable of creating in effect a larger clock domain by allowing data communication across a cluster of smaller domains.

SUMMARY

In one set of embodiments, a method for initializing a linear series of video routers in a video processing system (e.g. a graphics accelerator) may be configured as follows. A host software routine, executing on a host computer coupled to the video processing system, may:

- programmatically select one of a plurality of link interface buffers in each video router of the linear series to form a first video path. The host software may programmatically select one of a plurality of pixel clock signals to drive output from the link interface buffers of the first video path;
- initialize read and write pointers of the selected link interface buffer in each video router of the first video path;
- sequentially remove a reset condition from the link interface buffers of the first video path starting from the first video router of the linear series.

The sequential reset removal operation is started after the selected pixel clock signal has stabilized. This condition ensures that one video data word is read from and written to each link interface buffer of the first video path in each cycle of the selected pixel clock from the moment the reset condition is removed. Thus, the address separation between the read pointer and the write pointer of each link interface buffer remains relatively constant (and relatively close to the program selected pre-reset separation).

BRIEF DESCRIPTION OF THE DRAWINGS

A better understanding of the present invention can be obtained when the following detailed description is considered in conjunction with the following drawings, in which.

Figure 1:
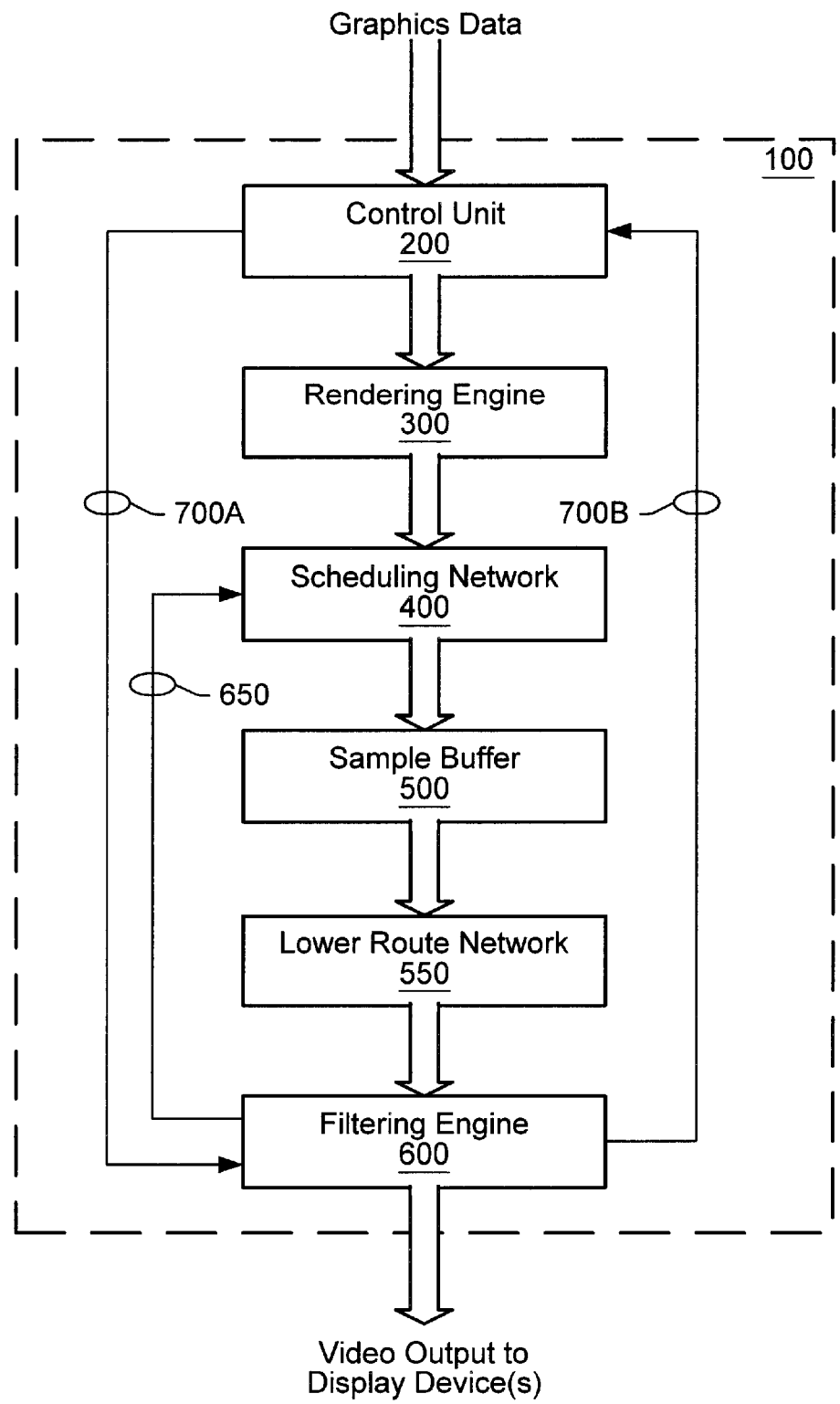
FIG. 1 illustrates one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

FIG. 1 illustrates one set of embodiments of a graphics accelerator 100 configured to perform graphics computations (especially 3D graphics computations). Graphics accelerator 100 may include a control unit 200, a rendering engine 300, a scheduling network 400, a sample buffer 500, a lower route network 550, and a filtering engine 600.

Figure 2:
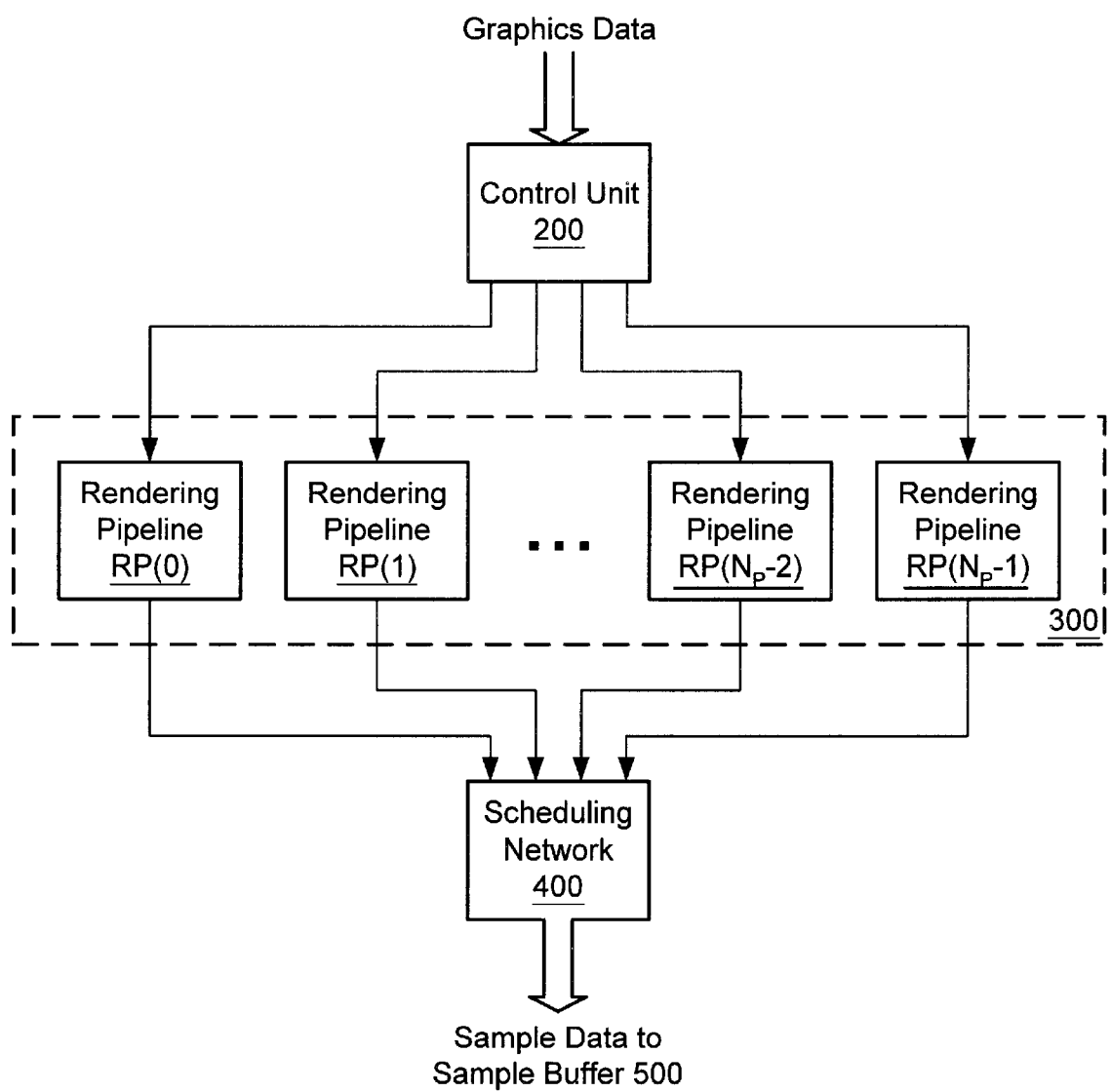
FIG. 2 illustrates one set of embodiments of a parallel rendering engine.

The rendering engine 300 may include a set of $N_{PL}$ rendering pipelines as suggested by FIG. 2, where $N_{PL}$ is a positive integer. The rendering pipelines, denoted as RP(0) through RP($N_{PL}$-1), are configured to operate in parallel. For example, in one embodiment, $N_{PL}$ equals four. In another embodiment, $N_{PL}$=8.

The control unit 200 receives a stream of graphics data from an external source (e.g. from the system memory of a host computer), and controls the distribution of the graphics data to the rendering pipelines. The control unit 200 may divide the graphics data stream into $N_{PL}$ substreams, which flow to the $N_{PL}$ rendering pipelines respectively. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g. triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X, Y, Z) for a vertex. The vertex instruction may also include one or more of a color vector, a normal vector and a vector of texture coordinates. The vertex instructions may also include connectivity information, which allows the rendering engine 300 to assemble the vertices into polygons (e.g. triangles).

Each rendering pipeline RP(K) of the rendering engine 300 may receive a corresponding stream of graphics data from the control unit 200, and performs rendering computations on the primitives defined by the graphics data stream. The rendering computations generate samples, which are written into sample buffer 500 through the scheduling network 400.

The filtering engine 600 is configured to read samples from the sample buffer 500, to perform a filtering operation on the samples resulting in the generation of a video pixel stream, and, to convert the video pixel stream into an analog video signal. The analog video signal may be supplied to one or more video output ports for display on one or more display devices (such as computer monitors, projectors, head-mounted displays and televisions).

Furthermore, the graphics system 100 may be configured to generate up to $N_D$ independent video pixel streams denoted VPS(0), VPS(1), . . . , VPS($N_D$-1), where $N_D$ is a positive integer. Thus, a set of host applications (running on a host computer) may send $N_D$ graphics data streams denoted GDS(0), GDS(1), . . . , GDS($N_D$-1) to the graphics system 100. The rendering engine 300 may perform rendering computations on each graphics data stream GDS(I), for I=0, 1, 2, . . . , $N_D$-1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert each video pixel stream VPS(I) into a corresponding analog video signal AVS(I). The $N_D$ analog video signals may be supplied to a set of video output ports for display on a corresponding set of display devices. In one embodiment, $N_D$ equals two. In another embodiment, $N_D$ equals four.

The filtering engine 600 may send sample data requests to the scheduling network 400 through a request bus 650. In response to the sample data requests, scheduling network 400 may assert control signals, which invoke the transfer of the requested samples (or groups of samples) to the filtering engine 600.

In various embodiments, the sample buffer 500 includes a plurality of memory units, and the filtering engine 600 includes a plurality of filtering units. The filtering units interface may interface with the lower router network 550 to provide data select signals. The lower route network 550 may use the data select signals to steer data from the memory units to the filtering units.

The control unit 200 may couple to the filtering engine 600 through a communication bus 700, which includes an outgoing segment 700A and a return segment 700B. The outgoing segment 700A may be used to download parameters (e.g. lookup table values) to the filtering engine 600. The return segment 700B may be used as a readback path for the video pixels generated by filtering engine 600. Video pixels transferred to control unit 200 through the return segment 700B may be forwarded to system memory (i.e. the system memory of a host computer), or perhaps, to memory (e.g. texture memory) residing on graphics system 100 or on another graphics accelerator.

The control unit 200 may include direct memory access (DMA) circuitry. The DMA circuitry may be used to facilitate (a) the transfer of graphics data from system memory to the control unit 200, and/or, (b) the transfer of video pixels (received from the filtering engine 600 through the return segment 700B) to any of various destinations (such as the system memory of the host computer).

Figure 3:
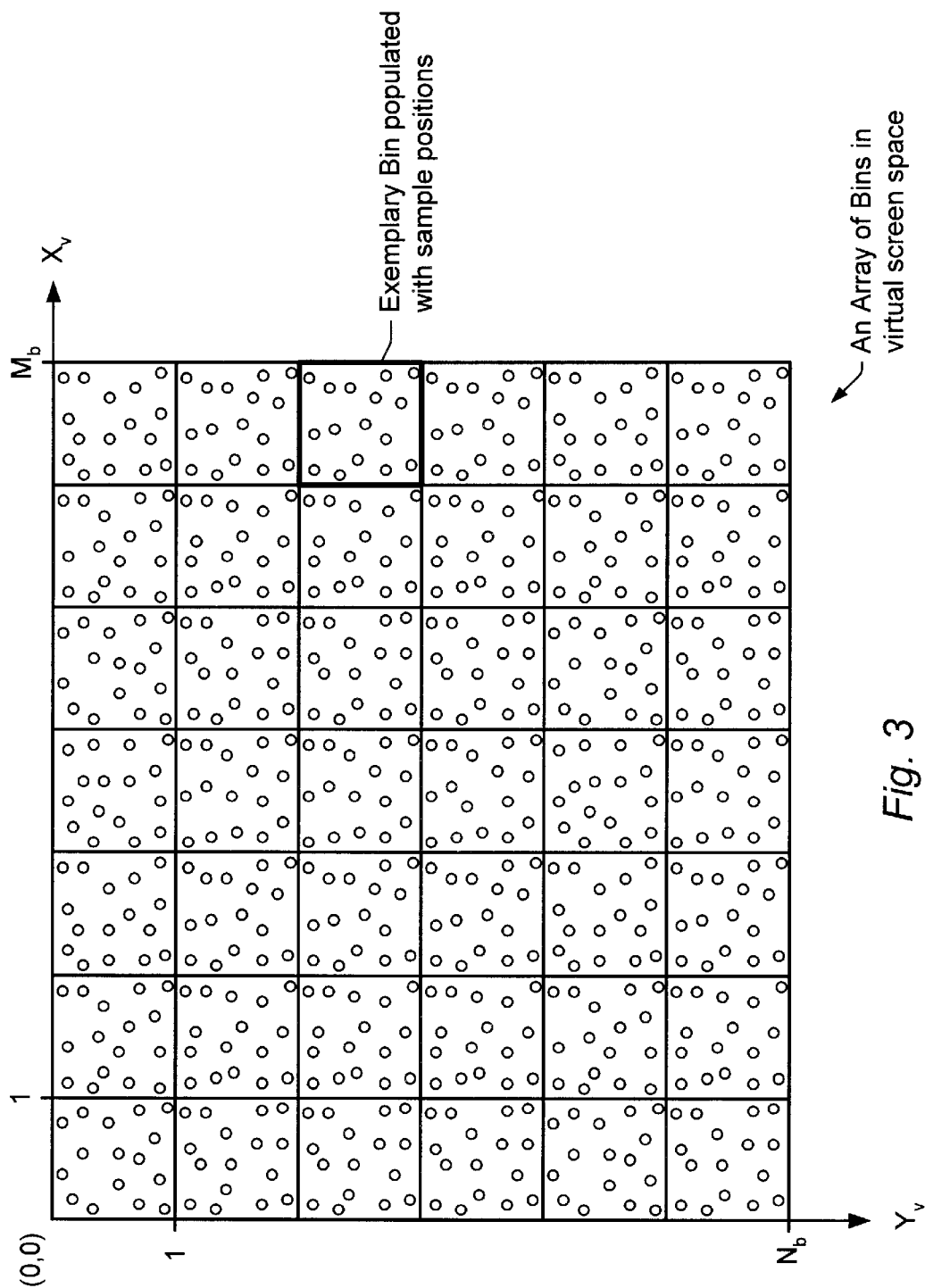
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins as suggested by FIG. 3. The array of spatial bins defines a rectangular window in a virtual screen space. The spatial bin array may have dimension $M_B \times N_B$, i.e., may comprise $M_B$ bins horizontally and $N_B$ bins vertically.

Each spatial bin may be populated with a number of sample positions. Sample positions are denoted as small circles. Each sample position may be defined by a horizontal offset and a vertical offset with respect to the origin of the bin in which it resides. The origin of a bin may be at its top-left corner. Note that any of a variety of other positions on the boundary or in the interior of a bin may serve as its origin. A sample may be computed at each of the sample positions. A sample may include a color vector, and other values such as z depth and transparency (i.e. an alpha value).

The sample buffer 500 may organize the storage of samples according to memory bins. Each memory bin corresponds to one of the spatial bins, and stores the samples for the sample positions in a corresponding spatial bin.

If a rendering pipeline RP(k) determines that a spatial bin intersects with a given primitive (e.g. triangle), the rendering pipeline may:

(a) generate $N_{s/b}$ sample positions in the spatial bin;

(b) determine which of the $N_{s/b}$ sample positions reside interior to the primitive;

(c) compute a sample for each of the interior sample positions, and (d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing steps (a), (b) and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
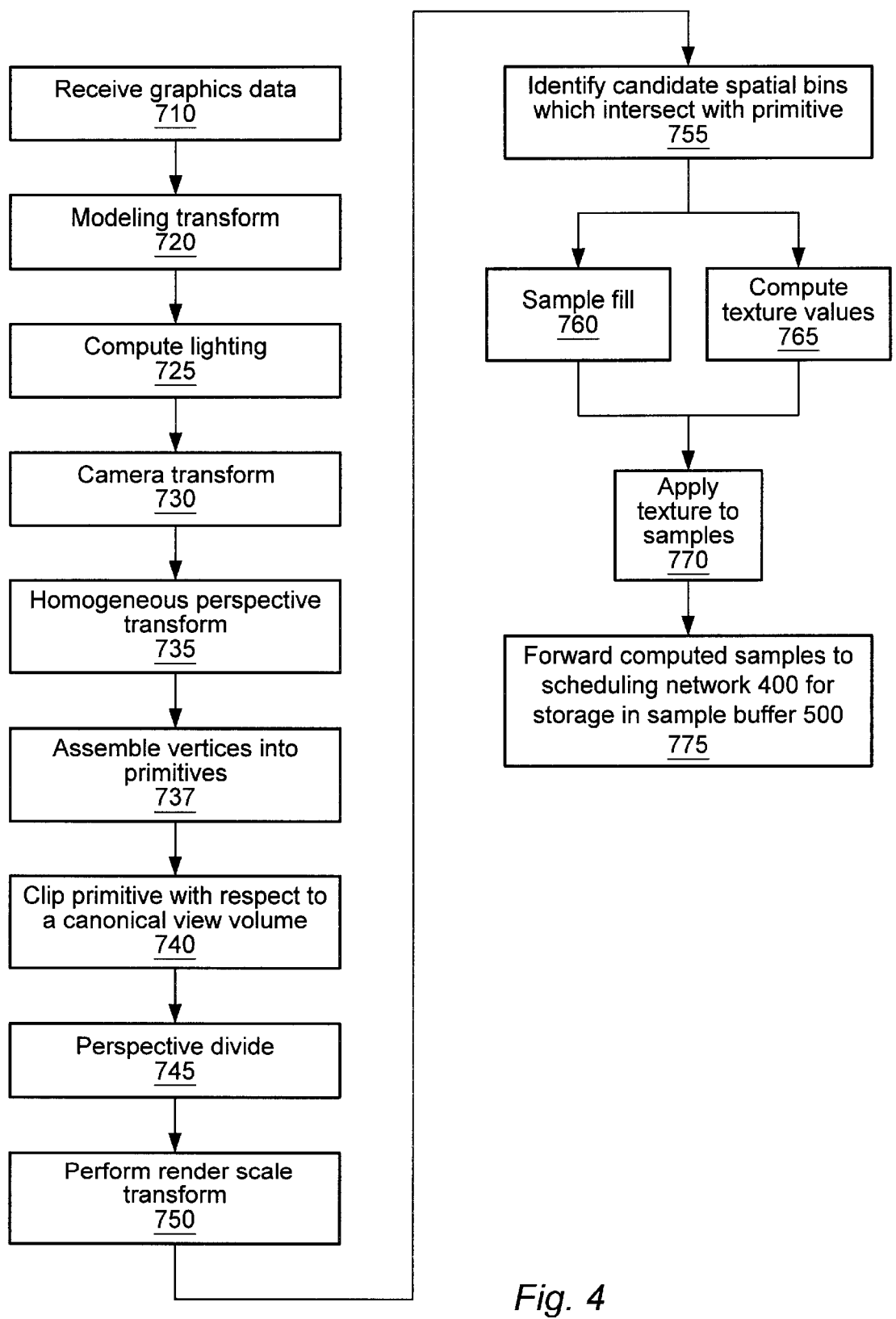
FIG. 4 illustrates one set of embodiments of a rendering methodology which may be used to generate samples in response to received stream of graphics data.

FIG. 4 illustrates one set of embodiments of a rendering process implemented by each rendering pipeline RP(K) of the $N_{PL}$ rendering pipelines.

In step 710, rendering pipeline RP(K) receives a stream of graphics data from the control unit 200 (e.g. stores the graphics data in an input buffer).

The graphics data may have been compressed according to any of a variety of data compression and/or geometry compression techniques. Thus, the rendering pipeline RP(K) may decompress the graphics data to recover a stream of vertices.

In step 720, the rendering pipeline RP(K) may perform a modeling transformation on the stream of vertices. The modeling transformation serves to inject objects into a world coordinate system. The modeling transformation may also include the transformation of any normal vectors associated with the stream vertices. The matrix used to perform the modeling transformation is dynamically programmable by host software.

In step 725, rendering engine 300 may subject the stream vertices to a lighting computation. Lighting intensity values (e.g. color intensity values) may be computed for the vertices of polygonal primitives based on one or more of the following:

(1) the vertex normals;

(2) the position and orientation of a virtual camera in the world coordinate system;

(3) the intensity, position, orientation and type-classification of light sources; and (4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera are dynamically adjustable. Furthermore, the intensity, position, orientation and type-classification of light sources are dynamically adjustable.

It is noted that separate virtual camera positions may be maintained for the viewer's left and right eyes in order to support stereo video. For example, rendering pipeline RP(K) may alternate between the left camera position and the right camera position from one animation frame to the next.

In step 730, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may require updating whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

In step 735, the rendering pipeline RP(K) may perform a homogenous perspective transformation to map primitives from the camera coordinate system into a clipping space, which is more convenient for a subsequent clipping computation. In some embodiments, steps 730 and 735 may be combined into a single transformation.

In step 737, rendering pipeline RP(K) may assemble the vertices to form primitives such as triangles, lines, etc.

In step 740, rendering pipeline RP(K) may perform a clipping computation on each primitive. In clipping space, the vertices of primitives may be represented as 4-tuples (X, Y, Z, W). In some embodiments, the clipping computation may be implemented by performing a series of inequality tests as follows:

$T1=(-W \leq X)$ $T2=(X \leq W)$ $T3=(-W \leq Y)$ $T4=(Y \leq W)$ $T5=(-W \leq Z)$ $T6=(Z \leq 0)$ If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e. subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

In step 745, rendering pipeline RP(K) may perform a perspective divide computation on the homogenous post-clipping vertices (X, Y, Z, W) according to the relations $$x = X/W$$

$$y = Y/W$$

$$z = Z/W.$$

After the perspective divide, the x and y coordinates of each vertex (x, y, z) may reside in a viewport rectangle, for example, a viewport square defined by the inequalities $-1 \leq x \leq 1$ and $-1 \leq y \leq 1$.

In step 750, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_v$ and $Y_v$ denote the horizontal and vertical coordinate respectively in the virtual screen space.

Figure 5:
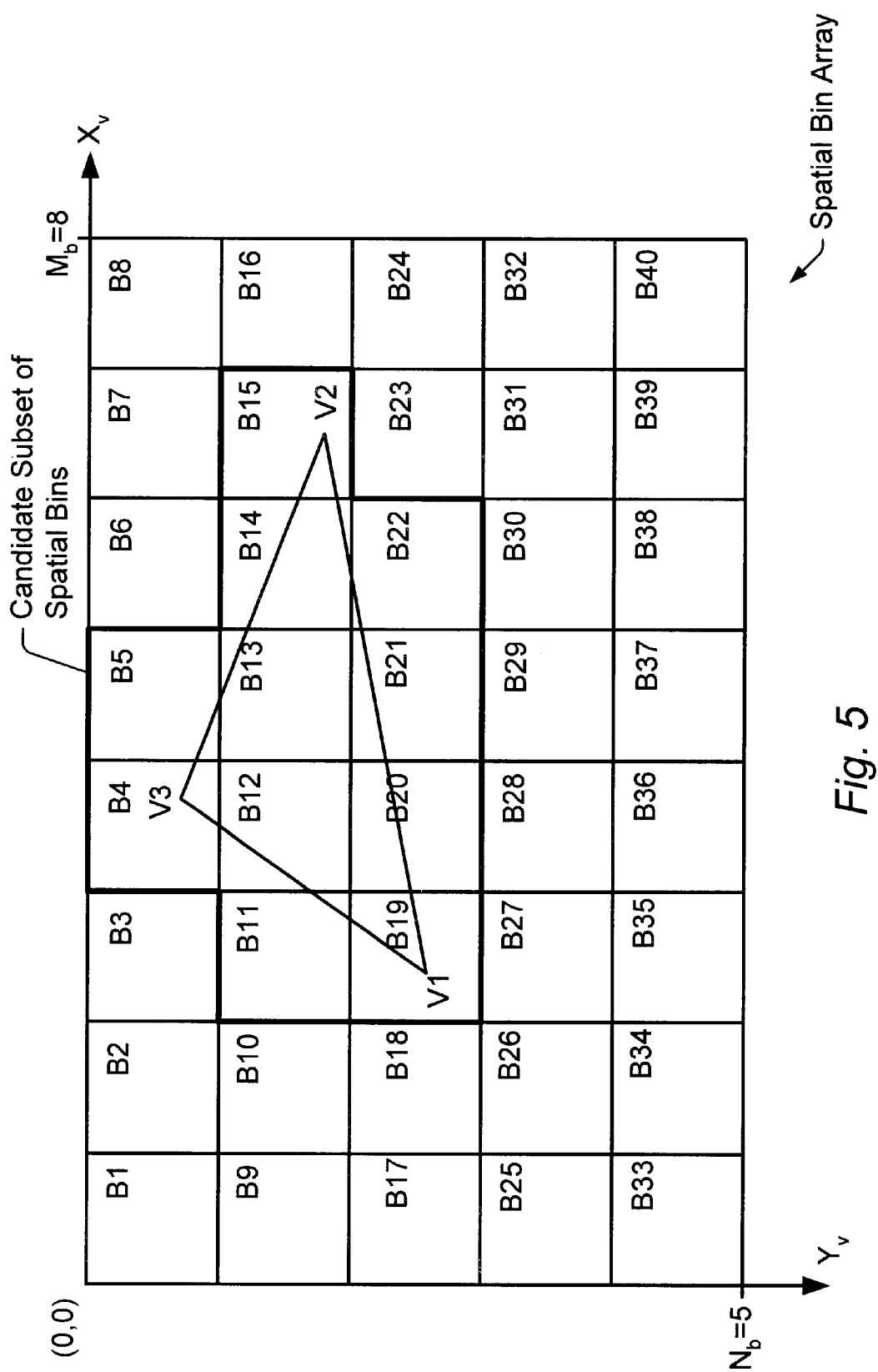
FIG. 5 illustrates a set of candidate bins which intersect a particular triangle.

In step 755, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration, and are much smaller than would typically be used in most applications of graphics system 100.

Figure 6:
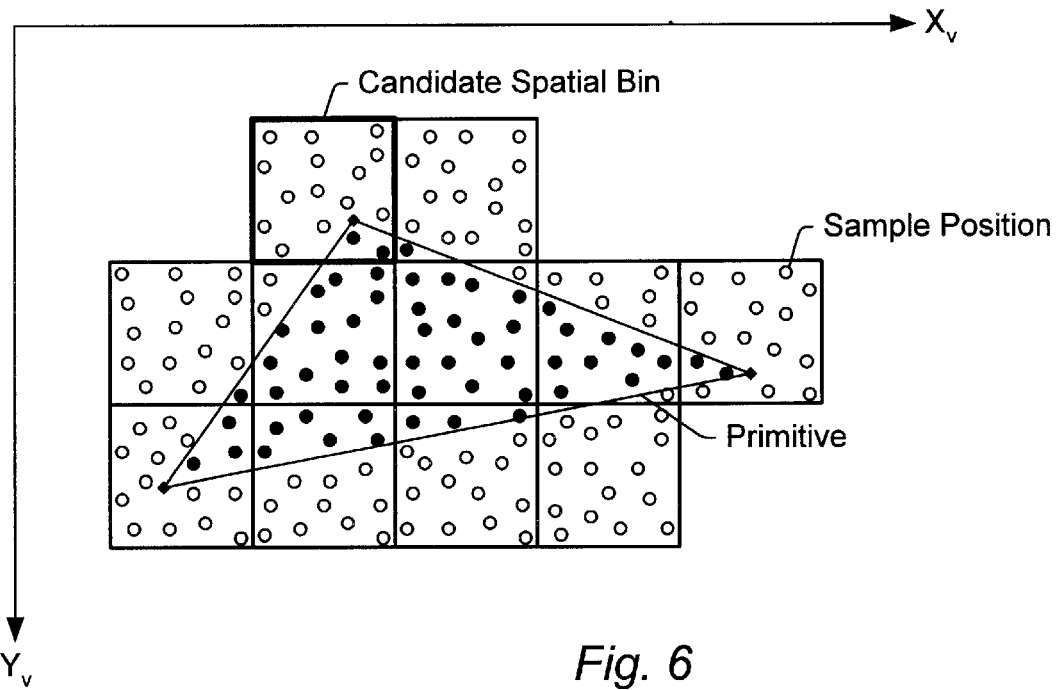
FIG. 6 illustrates the identification of sample positions in the candidate bins which fall interior to the triangle.

In step 760, the rendering pipeline RP(K) performs a "sample fill" operation on candidate bins identified in step 755 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include a plurality of sample fill units to parallelize the sample fill computation. For example, two sample fill units may perform the sample fill operation in parallel on two candidate bins respectively. (This N=2 example generalizes to any number of parallel sample fill units). In FIG. 6, interior sample positions are denoted as small black dots, and exterior sample positions are denoted as small circles.

Figure 7:
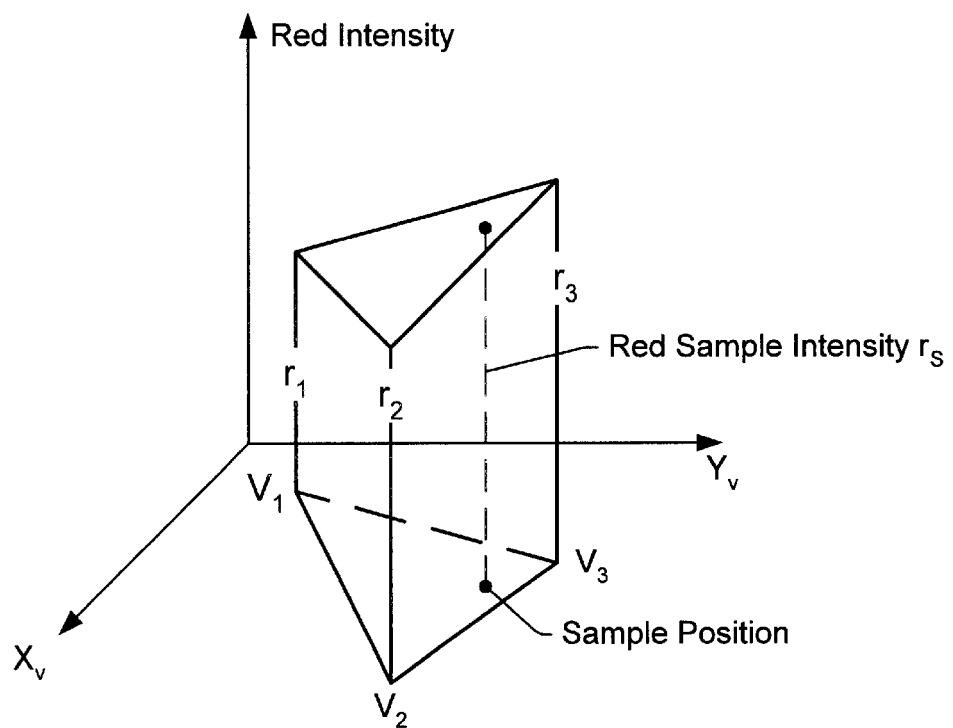
FIG. 7 illustrates the computation of a red sample component based on a spatial interpolation of the red components at the vertices of the containing triangle.

The rendering pipeline RP(K) may compute the color components (r,g,b) for each interior sample position in a candidate bin based on a spatial interpolation of the corresponding vertex color components as suggested by FIG. 7. FIG. 7 suggests a linear interpolation of a red intensity value $r_s$ for a sample position inside the triangle defined by the vertices V1, V2, and V3 in virtual screen space (i.e. the horizontal plane of the figure). The red color intensity is shown as the up-down coordinate. Each vertex Vk has a corresponding red intensity value $r_k$. Similar interpolations may be performed to determine green, blue, z and alpha values.

In step 765, rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include a plurality of texture filtering units to parallelize the computation of texture values for one or more candidate bins.

The rendering pipeline RP(K) may include a sample fill pipeline which implements step 760 and a texture pipeline which implements step 765. The sample fill pipeline and the texture pipeline may be configured for parallel operation. The sample fill pipeline may perform the sample fill operations on one or more candidate bins while the texture fill pipeline computes the texture values for the one or more candidate bins.

In step 770, the rendering pipeline RP(K) may apply the one or more texture values corresponding to each candidate bin to the color vectors of the interior samples in the candidate bin. Any of a variety of methods may be used to apply the texture values to the sample color vectors.

In step 775, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500, and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ are programmable parameters.

Figure 8:
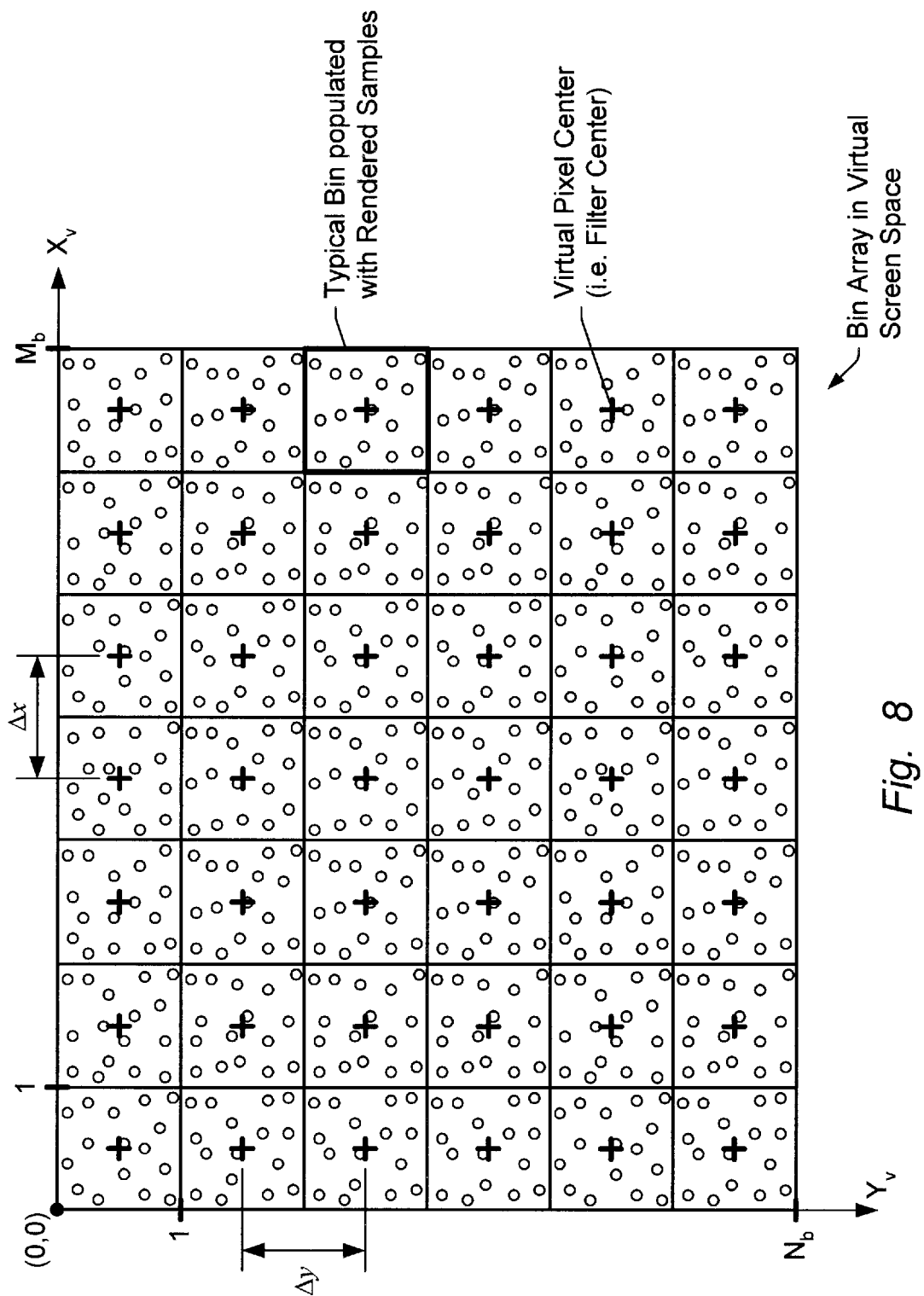
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position $(X_{start}, Y_{start})$. The horizontal displacement $\Delta X$, vertical displacement $\Delta Y$ and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement $\Delta x$ and vertical displacement $\Delta y$ may be assigned values greater than or less than one. Furthermore, the start position $(X_{start}, Y_{start})$ is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
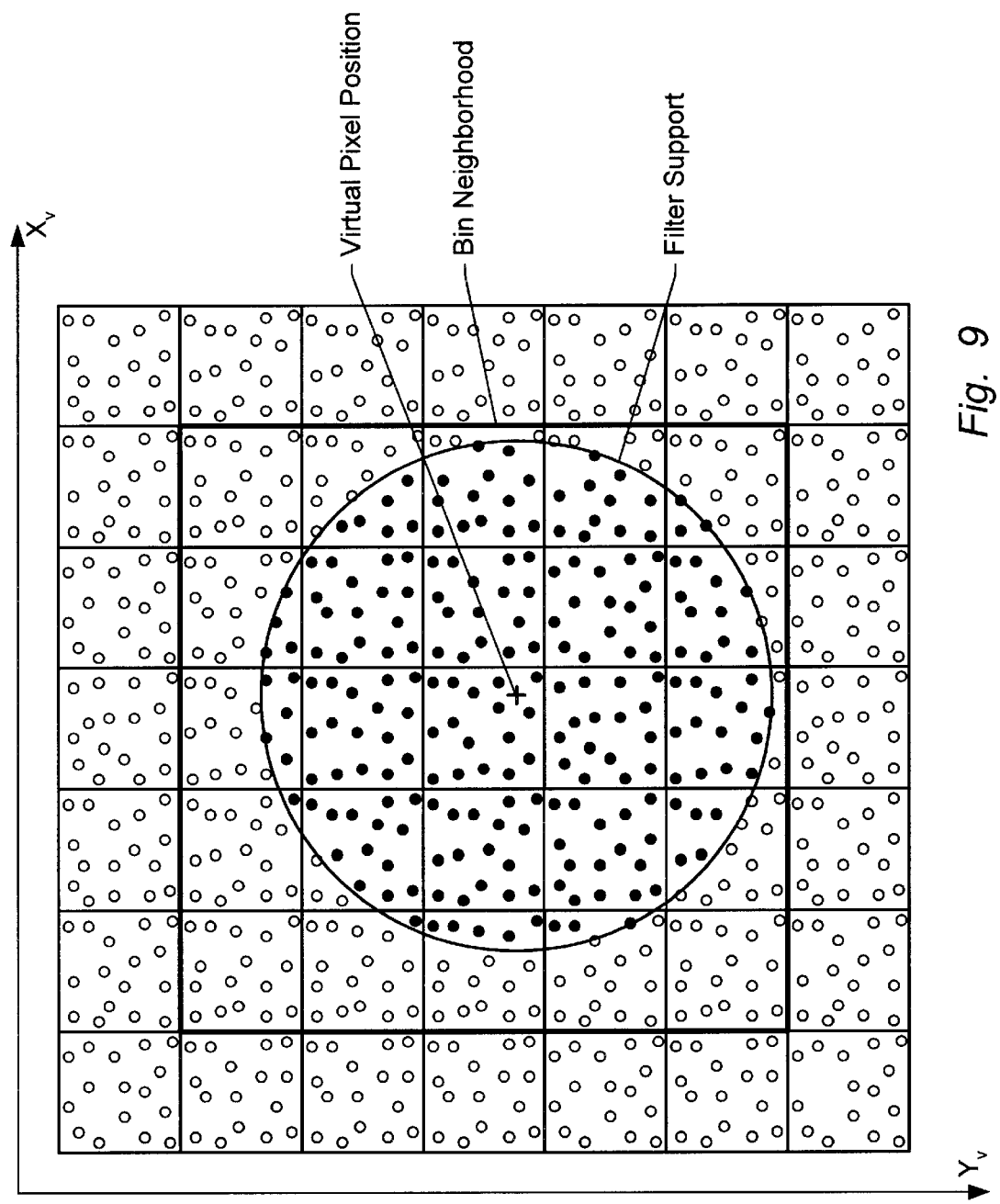
FIG. 9 illustrates the computation of a pixel at a virtual pixel position (denoted by the plus marker) according to one set of embodiments.

The filtering engine 600 may compute a video pixel at a particular virtual pixel position as suggested by FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression $$r_P = \Sigma C_S r_S,$$

where the summation ranges over each sample S in the filter support region, and where $r_S$ is the red sample value of the sample S. In other words, the filtering engine 600 may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \Sigma C_S.$$

The initial pixel values may then be multiplied by the reciprocal of E (or equivalently, divided by E) to determine normalized pixel values:

$$R_P = (1/E) * r_P$$
$$G_P = (1/E) * g_P$$
$$B_P = (1/E) * b_P$$
$$A_P = (1/E) * \alpha_P.$$

In one set of embodiments, the filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin which contains the virtual pixel position.

The filtering engine 600 may compute the square radius $(D_S)^2$ of each sample position $(X_S, Y_S)$ in the bin neighborhood with respect to the virtual pixel position $(X_P, Y_P)$ according to the expression:

$$(D_S)^2 = (X_S - X_P)^2 + (Y_S - Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

The filtering engine 600 may compute a normalized square radius $U_S$ for each valid sample S by multiplying the sample's square radius by the reciprocal of the filter's square radius:

$$U_s = (D_s)^2 \frac{1}{(R_f)^2}.$$

The normalized square radius $U_S$ may be used to access the filter coefficient table for the filter coefficient $C_S$. The filter coefficient table may store filter weights indexed by the normalized square radius.

In various embodiments, the filter coefficient table is implemented in RAM and is programmable by host software. Thus, the filter function (i.e. the filter kernel) used in the filtering process may be changed as needed or desired. Similarly, the square radius $(R_f)^2$ of the filter support and the reciprocal square radius $1/(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_S$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e. side length $2R_f$). Thus, the filtering engine 600 may compute boundary coordinates for the support square according to the expressions $X_P+R_f$, $X_P-R_f$, $Y_P+R_f$, and $Y_P-R_f$. Each sample S in the bin neighborhood may be marked as being valid if the sample's position $(X_S,Y_S)$ falls within the support square, i.e., if:

$$X_P-R_f<X_S<X_P+R_f \text{ and}$$

$$Y_P-R_f<Y_S<Y_P+R_f.$$

Otherwise the sample S may be marked as invalid. Each valid sample may be assigned the same filter weight value (e.g., $C_S=1$). It is noted that any or all of the strict inequalities (<) in the system above may be replaced with permissive inequalities ($\leq$). Various embodiments along these lines are contemplated.

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

In one set of embodiments, the filtering engine 600 may include a set of filtering units FU(0), FU(1), FU(2), . . . , FU($N_f$-1) operating in parallel, where the number $N_f$ of filtering units is a positive integer. For example, in one embodiment, $N_f=4$. In another embodiment, $N_f=8$.

The filtering units may be configured to partition the effort of generating each frame (or field of video) as disclosed in U.S. patent application Ser. No. 09/894,617 filed on Jun. 27, 2001, entitled "Flexible Video Architecture for Generating Video Streams".

A frame of video may comprise an $M_P \times N_P$ array of pixels, where $M_P$ denotes the number of pixels per line, and $N_P$ denotes the number of lines. Each filtering unit FU(K) may be configured to generate a corresponding subset of the pixels in the $M_P \times N_P$ pixel array. For example, in the $N_f=4$ case, the pixel array may be partitioned into four vertical stripes, and each filtering unit FU(K), K=0, 1, 2, 3, may be configured to generate the pixels of the corresponding stripe.

Filtering unit FU(K) may include a system of digital circuits, which implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f=4$) with equal width, $M_H(K)$ may be set equal to $M_P/4$ for K=0, 1, 2, 3. Filtering unit FU(K) may generate a stripe of pixels in a scan line fashion as follows:

```
I=0;
J=0;
X_P=X_start(K);
Y_P=Y_start(K);
while (J<N_P) {
    while (I < M_H(K) {
```

-continued

```
PixelValues = Filtration(X_P,Y_P);
Send PixelValues to Output Buffer;
X_P = X_P+ΔX(K);
I = I + 1;
}
X_P=X_start(K)
Y_P=Y_P+ΔY(K);
J=J+1;
}
```

The expression Filtration($X_P,Y_P$) represents the filtration of samples in the filter support region of the current virtual pixel position ($X_P,Y_P$) to determine the components (e.g. RGB values, and optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit FU(K) may include registers for programming the values $X_{start}(K)$, $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
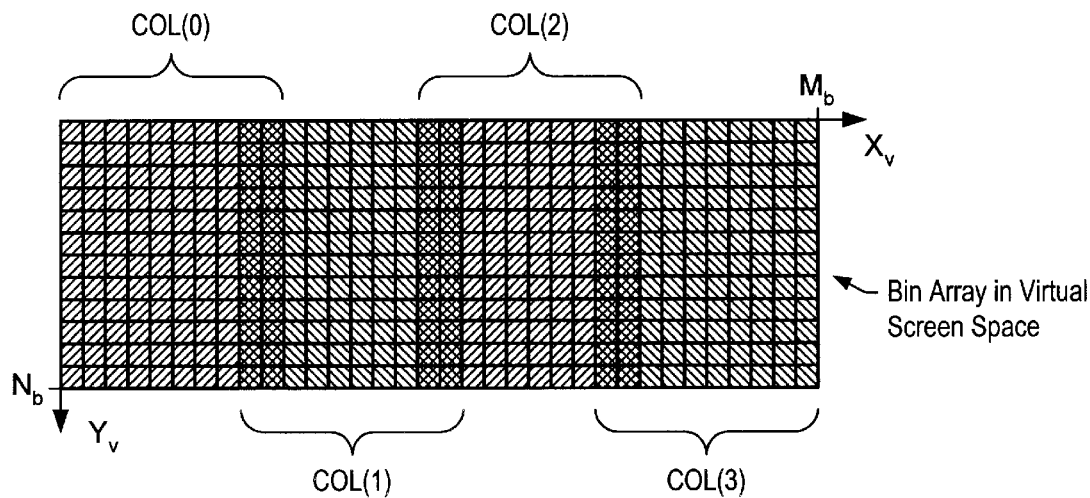
FIG. 10 illustrates a set of columns in the spatial bin array, wherein the $K^{th}$ column defines the subset of memory bins (from the sample buffer) which are used by a corresponding filtering unit FU(K) of the filtering engine.

Each filtering unit FU(K) accesses a corresponding subset of bins from the sample buffer 500 to generate the pixels of the $K^{th}$ stripe. For example, each filtering unit FU(K) may access bins corresponding to a column COL(K) of the bin array in virtual screen space as suggested by FIG. 10. Each column may be a rectangular subarray of bins. Note that column COL(K) may overlap with adjacent columns. This is a result of using a filter function with filter support that covers more than one spatial bin. Thus, the amount of overlap between adjacent columns may depend on the radius of the filter support.

Figure 11:
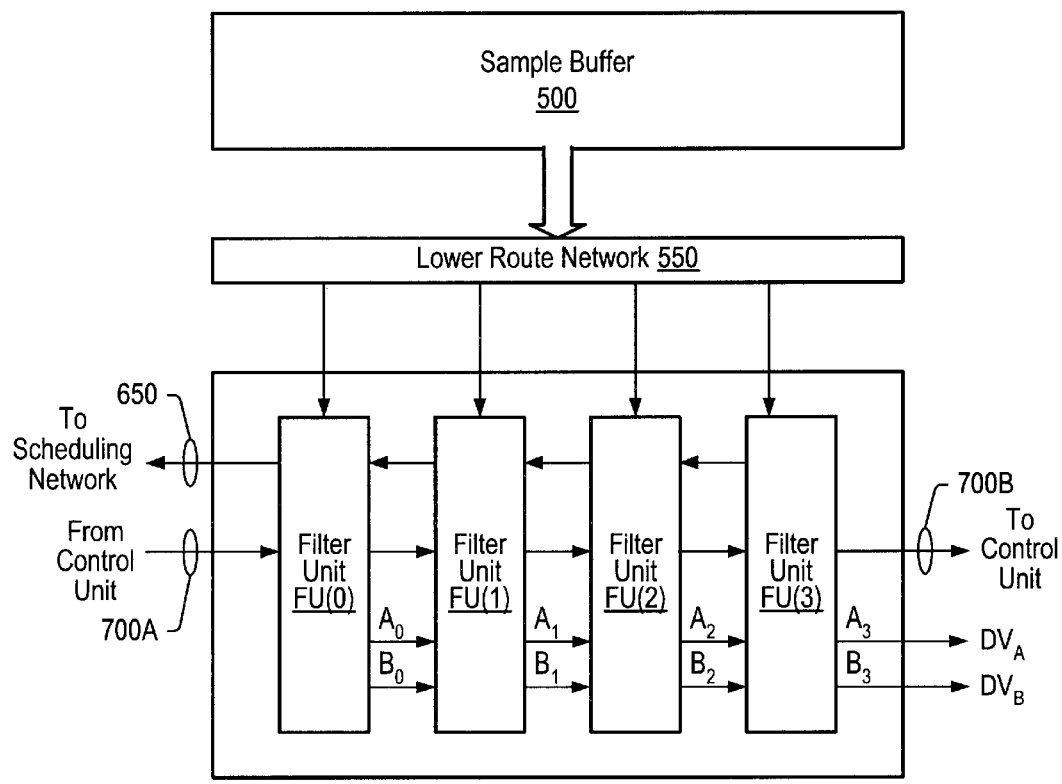
FIG. 11 illustrates one set of embodiments of filtering engine 600.

The filtering units may be coupled together in a linear succession as suggested by FIG. 11 in the case $N_f=4$. Except for the first filtering unit FU(0) and the last filtering unit FU($N_f$-1), each filtering unit FU(K) may be configured to receive digital video input streams $A_{K-1}$ and $B_{K-1}$ from a previous filtering unit FU(K-1), and to transmit digital video output streams $A_K$ and $B_K$ to the next filtering unit FU(K+1). The first filtering unit FU(0) generates video streams $A_0$ and $B_0$ and transmits these streams to filtering unit FU(1). The last filtering unit FU($N_f$-1) receives digital video streams $A_{Nf-2}$ and $B_{Nf-2}$ from the previous filtering unit FU($N_f$-2), and generates digital video output streams $A_{Nf-1}$ and $B_{Nf-1}$ also referred to as video streams $DV_A$ and $DV_B$ respectively. Video streams $A_0, A_1, \ldots, A_{Nf-1}$ are said to belong to video stream A. Similarly, video streams $B_0, B_1, \ldots, B_{Nf-1}$ are said to belong to video stream B.

Each filtering unit FU(K) may be programmed to mix (or substitute) its computed pixel values into either video stream A or video stream B. For example, if the filtering unit FU(K) is assigned to video stream A, the filtering unit FU(K) may mix (or substitute) its computed pixel values into video stream A, and pass video stream B unmodified to the next filtering unit FU(K+1). In other words, the filtering unit FU(K) may mix (or replace) at least a subset of the dummy pixel values present in video stream $A_{K-1}$ with its locally computed pixel values. The resultant video stream $A_K$ is transmitted to the next filtering unit. The first filtering unit FU(0) may generate video streams $A_{-1}$ and $B_{-1}$ containing dummy pixels (e.g., pixels having a background color), and mix (or substitute) its computed pixel values into either video stream $A_{-1}$, or $B_{-1}$ and pass the resulting streams $A_0$ and $B_0$ to the filtering unit FU(1). Thus, the video streams A and B mature into complete video signals as they are operated on by the linear succession of filtering units.

The filtering unit FU(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f=4$, it is noted that the inventive principles described in this special case naturally generalize to arbitrary values for the parameter $N_f$ (the number of filtering units).

Figure 12:
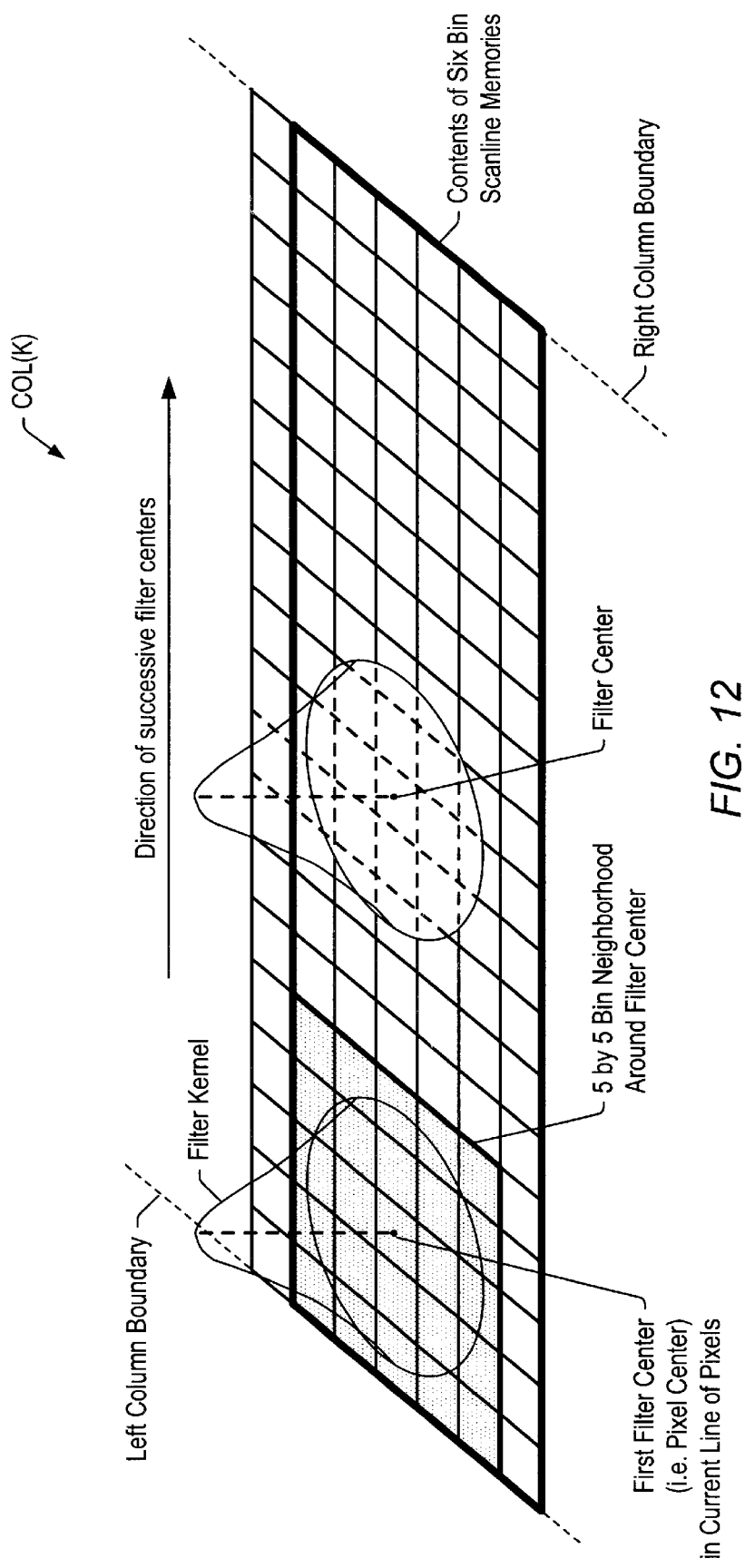
FIG. 12 illustrates one embodiment of a computation of pixels at successive filter center (i.e. virtual pixel centers) across a bin column.

In one set of embodiments, each filtering unit FU(K) may include (or couple to) a plurality of bin scanline memories (BSMs). Each bin scanline memory may contain sufficient capacity to store a horizontal line of bins within the corresponding column COL(K). For example, in some embodiments, filtering unit FU(K) may include six bin scanline memories as suggested by FIG. 12.

Filtering unit FU(K) may move the filter centers through the column COL(K) in a raster fashion, and generate a pixel at each filter center. The bin scanline memories may be used to provide fast access to the memory bins used for a line of pixel centers. As the filtering unit FU(K) may use samples in a 5 by 5 neighborhood of bins around a pixel center to compute a pixel, successive pixels in a line of pixels end up using a horizontal band of bins that spans the column and measures five bins vertically. Five of the bin scan lines memories may store the bins of the current horizontal band. The sixth bin scan line memory may store the next line of bins, after the current band of five, so that the filtering unit FU(K) may immediately begin computation of pixels at the next line of pixel centers when it reaches the end of the current line of pixel centers.

As the vertical displacement $\Delta Y$ between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit FU(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one larger than the diameter (or side length) of the bin neighborhood used for the computation of a single pixel. (For example, in an alternative embodiment, the bin neighborhood may be a 7×7 array of bins.)

Furthermore, each of the filtering units FU(K) may include a bin cache array to store the memory bins that are immediately involved in a pixel computation. For example, in some embodiments, each filtering unit FU(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement $(\Delta X, \Delta Y)$ to the vector position $(X_{bin}, Y_{bin})$ of the bin's origin (e.g. the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements $(\Delta X, \Delta Y)$. The jitter table may have sufficient capacity to store vector displacements for an $M_J \times N_J$ tile of bins. Assuming a maximum sample position density of $D_{max}$ samples per bin, the jitter table may then store $M_J * N_J * D_{max}$ vector displacements to support the tile of bins. Host software may load the jitter table with a pseudo-random pattern of vector displacements to induce a pseudo-random pattern of sample positions. In one embodiment, $M_J=N_J=2$ and $D_{max}=16$.

A straightforward application of the jitter table may result in a sample position pattern, which repeats with a horizontal period equal to $M_J$ bins, and a vertical period equal to $N_J$ bins. However, in order to generate more apparent randomness in the pattern of sample positions, each rendering engine may also include a permutation circuit, which applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500, and may filter the samples to generate pixels. Each filtering unit may include a copy of the jitter table and permutation circuit, and thus, may reconstruct the sample positions for the samples it receives from the sample buffer 500, i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs, SDRAMs, RDRAMs, 3DRAMs or 3DRAM64s. In one collection of embodiments, the memory devices are 3DRAM64 devices manufactured by Mitsubishi Electric Corporation.

RAM is an acronym for random access memory.

SRAM is an acronym for static random access memory.

DRAM is an acronym for dynamic random access memory.

SDRAM is an acronym for synchronous dynamic random access memory.

RDRAM is an acronym for Rambus DRAM.

The memory devices of the sample buffer may be organized into $N_{MB}$ memory banks denoted MB(0), MB(1), MB(2), . . . , MB($N_{MB}-1$), where $N_{MB}$ is a positive integer. For example, in one embodiment, $N_{MB}$ equals eight. In another embodiment, $N_{MB}$ equals sixteen.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:

30 bits of sample color (for front buffer), 30 bits of sample color (for back buffer), 16 bits of alpha and/or overlay, 10 bits of window ID, 26 bits of z depth, and 4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single buffered Z in one chip.

Figure 13:
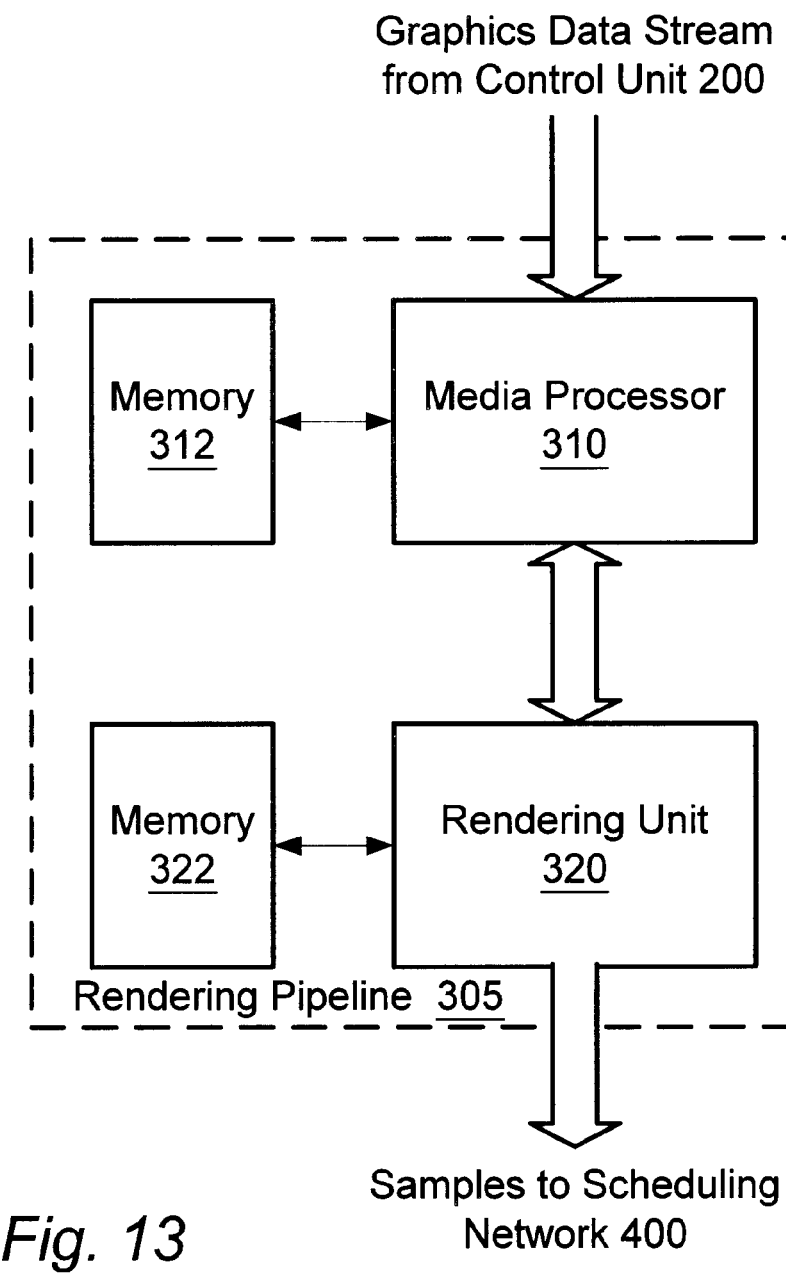
FIG. 13 illustrates one set of embodiments of a rendering pipeline comprising a media processor and a rendering unit.

As described above, the rendering engine 300 may include a set of rendering pipelines RP(0), RP(1), . . . , RP($N_{PL}$–1). FIG. 13 illustrates one embodiment of a rendering pipeline 305 that may be used to implement each of the rendering pipelines RP(0), RP(1), . . . , RP($N_{PL}$–1). The rendering pipeline 305 may include a media processor 310 and a rendering unit 320.

The media processor 310 may operate on a stream of graphics data received from the control unit 200. For example, the media processor 310 may perform the three-dimensional transformation operations and lighting operations such as those indicated by steps 710 through 735 of FIG. 4. The media processor 310 may be configured to support the decompression of compressed geometry data.

The media processor 310 may couple to a memory 312, and may include one or more microprocessor units. The memory 312 may be used to store program instructions and/or data for the microprocessor units. (Memory 312 may also be used to store display lists and/or vertex texture maps.) In one embodiment, memory 312 comprises direct Rambus DRAM (i.e. DRDRAM) devices.

The rendering unit 320 may receive transformed and lit vertices from the media processor, and perform processing operations such as those indicated by steps 737 through 775 of FIG. 4. In one set of embodiments, the rendering unit 320 is an application specific integrated circuit (ASIC). The rendering unit 320 may couple to memory 322 which may be used to store texture information (e.g., one or more layers of textures). Memory 322 may comprise SDRAM (synchronous dynamic random access memory) devices. The rendering unit 310 may send computed samples to sample buffer 500 through scheduling network 400.

Figure 14:
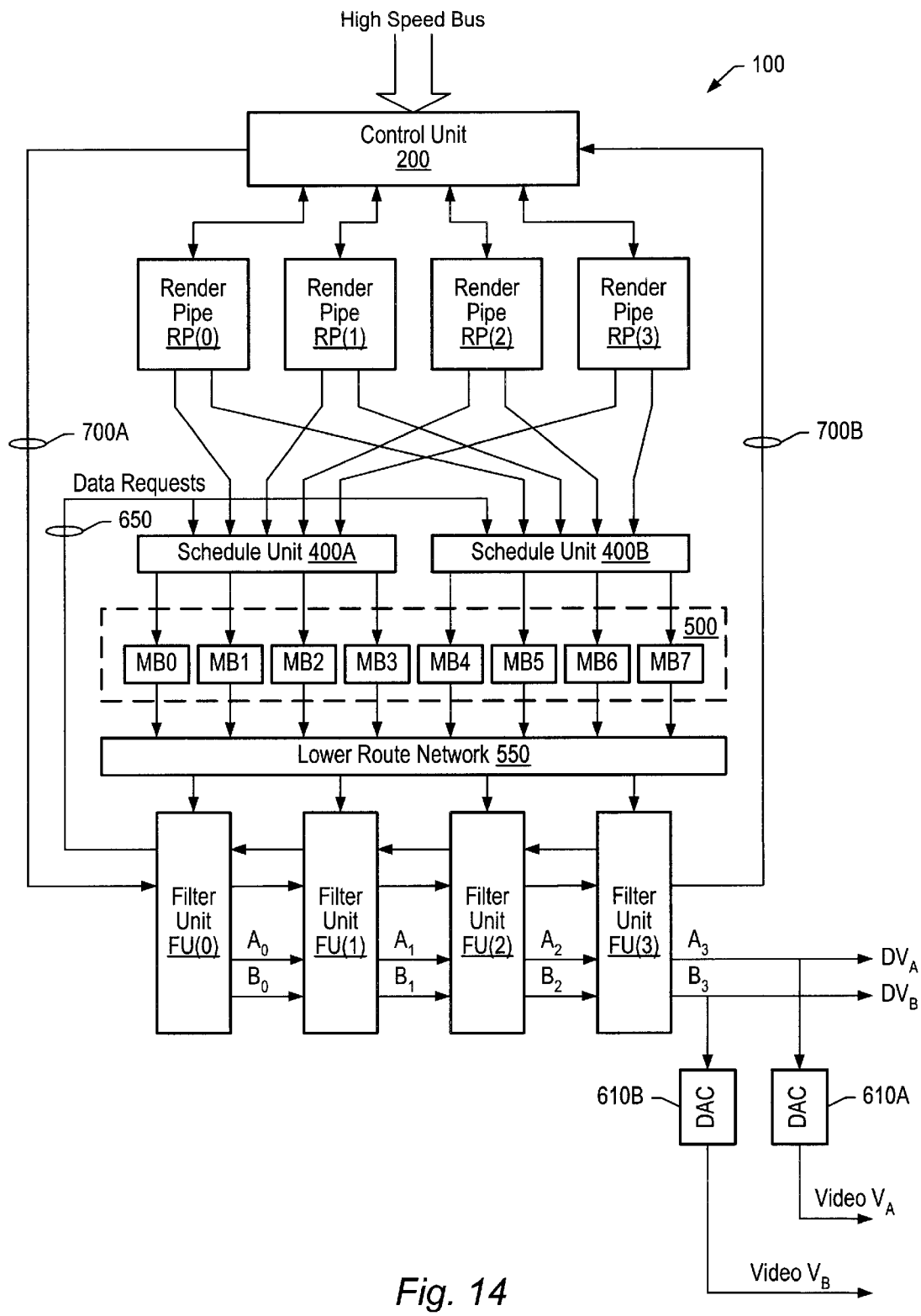
FIG. 14 illustrates one embodiment of graphics accelerator 100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units FU(0) through FU(3). The filtering units may generate two digital video streams $DV_A$ and $DV_B$. The digital video streams $DV_A$ and $DV_B$ may be supplied to digital-to-analog converters (DACs) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
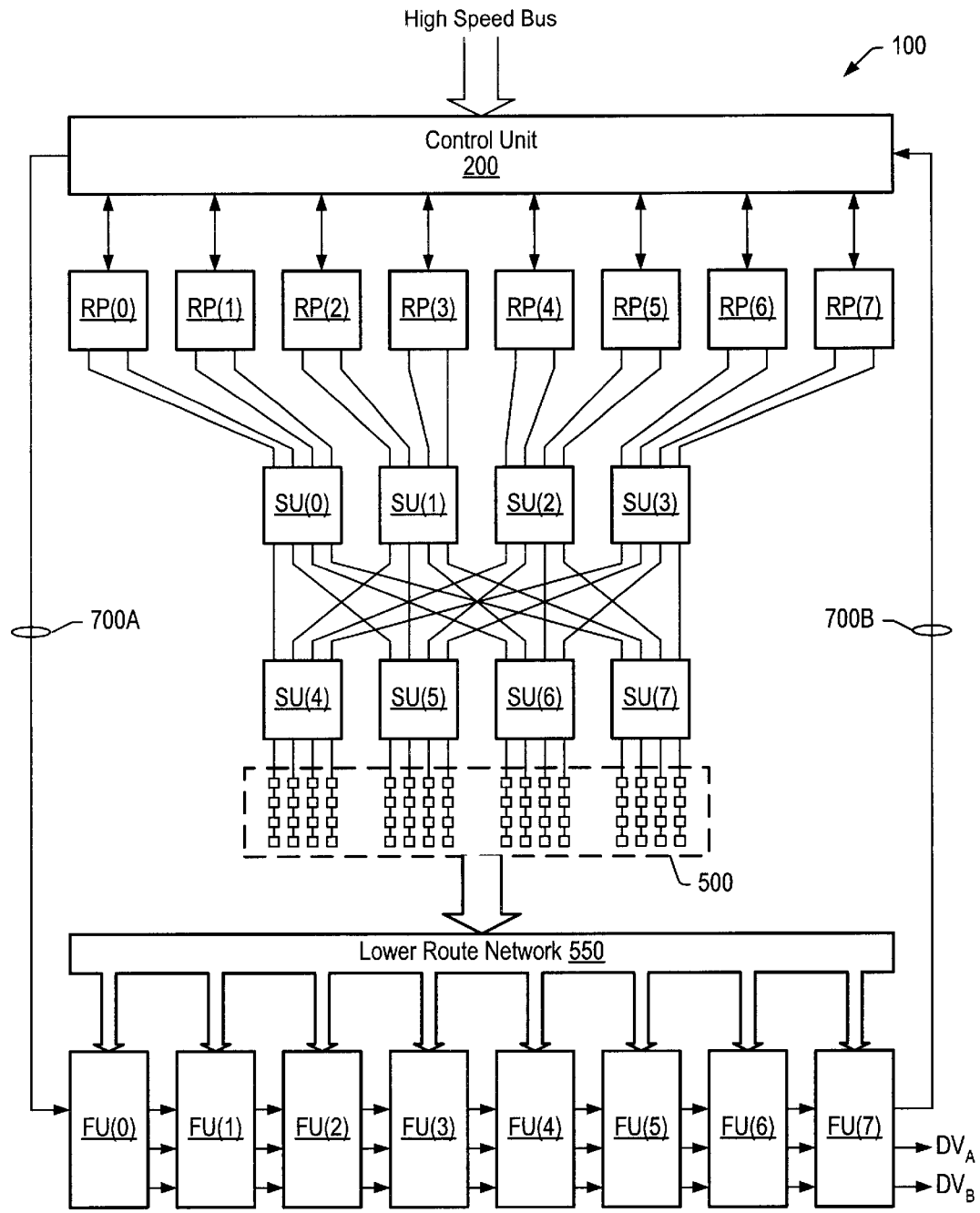
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units FU(0) through FU(7). This embodiment of graphics system 100 also includes DACs to convert the digital video streams $DV_A$ and $DV_B$ into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

The embodiments illustrated in FIGS. 14 and 15 are meant to suggest a vast ensemble of embodiments that are obtainable by varying design parameters such as the number of rendering pipelines, the number of schedule units, the number of memory banks, the number of filtering units, the number of video channels generated by the filtering units, etc.

Media Processor 310

Figure 16:
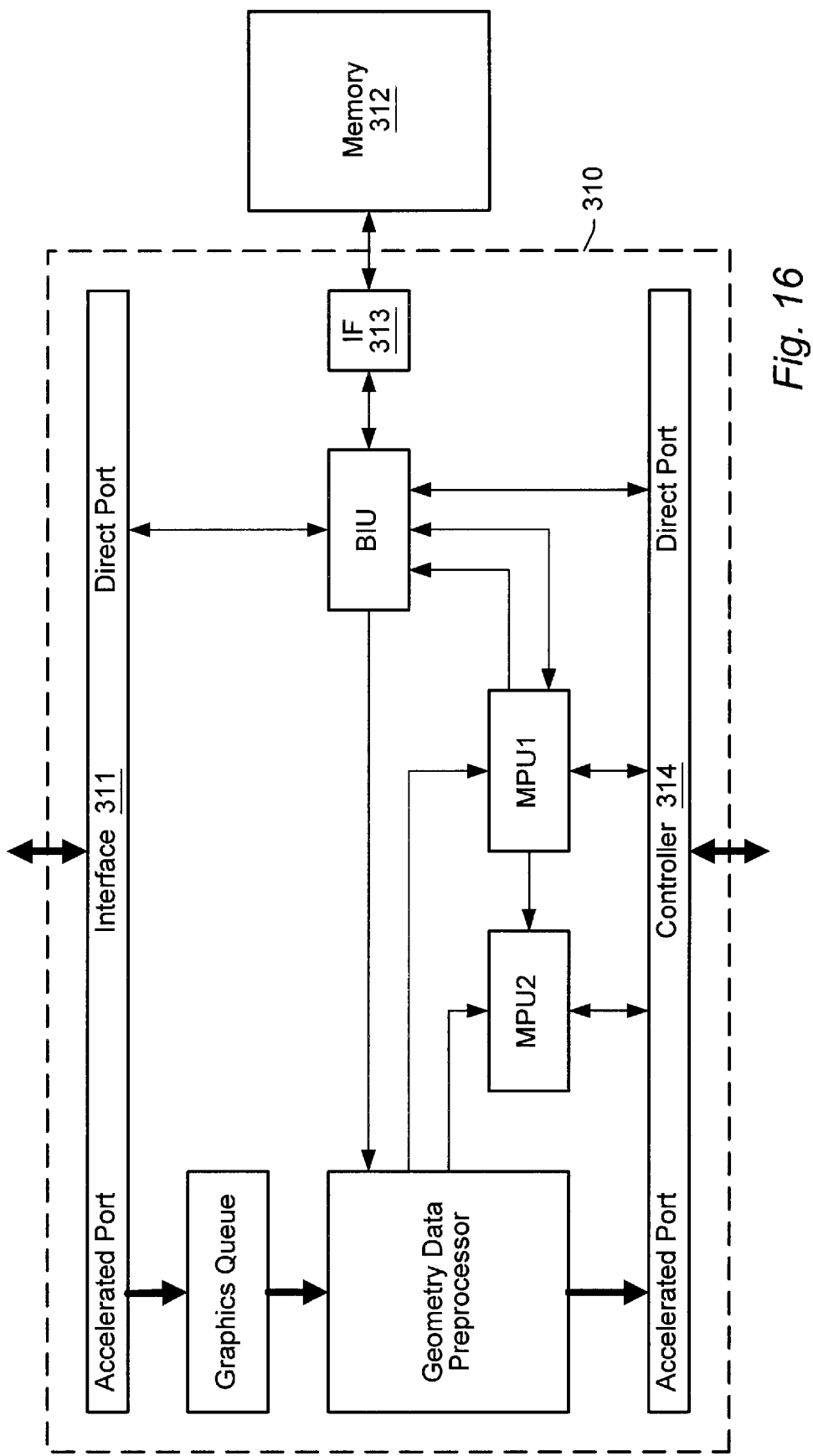
FIG. 16 is a block diagram of one embodiment of media processor 310.

FIG. 16 illustrates one embodiment of the media processor 310. The media processor 310 receives a stream of graphics data from the control unit 200 through an interface 311. A graphics queue may buffer the stream of data received via the accelerated port of the interface 311. The received graphics data may include graphics primitives. The media processor 310 may also include a geometry data preprocessor (GPP) and one or more microprocessor units (MPUs). The microprocessor units may be programmed to perform vertex transformation, lighting calculations and various other functions, and to send the results to rendering unit 320. The microprocessor units may also have read/write access to texels (i.e. the smallest addressable unit of a texture map) in the rendering unit 320. The geometry data preprocessor may be configured to decompress geometry data, to convert and format vertex data, to dispatch vertices and instructions to the microprocessor units, and to send vertex and attribute tags or register data to rendering unit 320.

Media processor 310 may include an interface 313 to memory 312. Memory 312 may be used for program and/or data storage for the microprocessor units. Memory 312 may also be used to store display lists and/or vertex texture maps.

In addition, media processor 310 may include a controller 314 for interfacing with rendering unit 320. The controller 315 may include an accelerated port path that allows media processor 310 to control rendering unit 320. The bus interface unit BIU provides a path to memory 312 via interface 313 and a path to rendering unit 320 via the controller 314.

Rendering Unit 320

Figure 17:
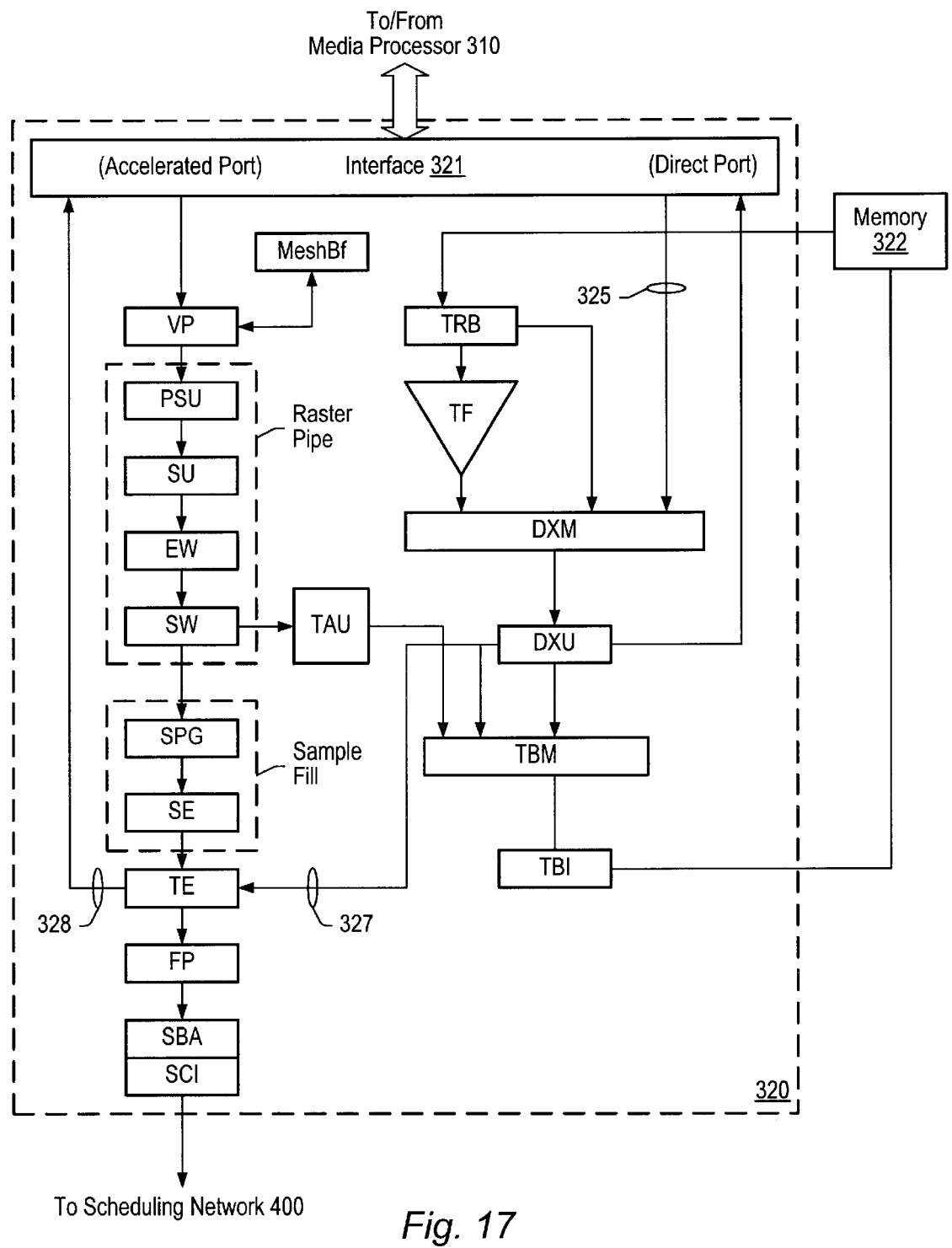
FIG. 17 is a block diagram of one embodiment of rendering unit 320.

FIG. 17 illustrates one embodiment of rendering unit 320. Rendering unit 320 may include an interface 321 for communicating with media processor 310. Interface 321 may receive graphics data and commands from media processor 310, and forward the graphics data and commands to vertex processor VP, data transfer multiplexor DXM, and/or, data transfer unit DXU.

Vertex processor VP may receive a stream of vertices from interface 321 and assemble the vertices into distinct primitives (e.g. triangles), and pass the primitives to a presetup unit PSU. The vertices may carry connectivity information that specifies how the vertices are to be assembled into primitives. Vertices may be saved in and/or retrieved from a mesh buffer MSHB.

The presetup unit PSU and setup unit SU may compute parameters that will be needed downstream, e.g., parameters such as the edge slopes, vertical and horizontal rates of change of red, green, blue, alpha, Z, etc. A triangle may be rendered by walking a bin (or a rectangle of bins, e.g., a 2×2 square of bins) across successive spans which cover the triangle. A span may traverse the triangle horizontally or vertically depending on the triangle. The edge walker EW may identify points on opposite edges of the triangle that define the endpoints of each span. The span walker SW may step across each span generating the addresses of successive bins (or rectangles) along the span.

The presetup unit PSU, setup unit SU, edge walker EW and span walker are collectively referred to as the raster pipe.

The sample position generator SPG may populate each bin along a span with sample positions. The sample evaluator SE may determine which of the sample positions in each bin reside interior to the current triangle. Furthermore, the sample evaluator SE may interpolate color, alpha and Z for the interior sample positions based on the parameters computed earlier in the pipeline. The sample position generator and sample evaluation are collectively referred to as the sample fill unit.

The texture environment unit TE may apply one or more layers of texture to the interior samples of each bin. Texture layers and/or other image information may be stored in memory 322. Texture filter TF accesses texels from memory 322 based on address information provided by texture address unit TAU, and filters the texels to generate texture values that are forwarded to the texture environment unit TE for application to samples. The texture address unit 168 may generate the texture memory addresses from texture coordinate information that is provided by the span walker SW per bin. After any desired texturing, samples may be sent down to the scheduling network 400 through the fragment processor FP, sample buffer address unit SBA and interface SCI.

Rendering unit 320 may also include an interface TBI to memory 322. (Memory 322 may serve as a texture buffer.) In one embodiment, rendering unit 320 may interface to memory 322 using an eight-way interleaved texel bus that allows rendering unit 320 to read from and write to memory 322.

Constructing Video Signals Over Multiple Clock Domains

In one set of embodiments, a video routing system may include a clock generator and a plurality of video routers VR(0), VR(1), . . . , VR($N_R$-1) coupled in a linear series, where the number $N_R$ of video routers is greater than or equal to two. The clock generator is configured to generate a source clock signal. Each video router VR(K), K=0, 1, . . . , $N_R$-1, may receive the source clock signal from the clock generator, and buffer the source clock signal to generate an output clock OC(K). Each video router VR(K), K=0, 1, . . . , $N_R$-1, may include an output interface configured to transmit a stream $S_K$ of video data words onto a connecting bus CB(K), where the output interface transmits one video data word of the stream $S_K$ onto the connecting bus CB(K) in response to each triggering edge of the output clock OC(K). The triggering edge may be the rising edge, or alternatively, the falling edge. The output interface may buffer the output clock OC(K) to generate a synchronous clock SC(K) and transmit the synchronous clock SC(K) onto the connecting bus CB(K). For K=0, 1, . . . , $N_R$-2, the connecting bus CB(K) conducts the stream $S_K$ and the synchronous clock SC(K) to the next video router VR(K+1). The connecting bus CB($N_R$-1) may conduct the stream $S_{N_R-1}$ and the synchronous clock SC($N_R$-1) to a digital-to-analog converter, or to the lead video router in another series of video routers.

Thus, each video router VR(K), K=1, 2, . . . , $N_R$-1 may receive the stream $S_{K-1}$ and the synchronous clock SC(K-1) from the previous video router VR(K-1) through the connecting bus CB(K-1). Furthermore, the first video router VR(0) may receive a stream $S_{-1}$ of video data words and a synchronous clock SC(-1) from some external source.

Each video router VR(K), K=0, 1, 2, . . . , $N_R$-1 may include a corresponding link interface buffer configured to receive the stream $S_{K-1}$ of video data words and the synchronous clock SC(K-1) from the connecting bus CB(K-1), or from the external source in the K=0 case. (The terms link interface buffer and through-video FIFO are used as synonyms herein.) The link interface buffer is configured to receive and internally store one of the video data words of the stream $S_{K-1}$ in response to each triggering edge of the synchronous clock SC(K-1). Furthermore, the link interface buffer is configured to generate a local stream LS(K) by accessing one of the internally stored video data words in response to each triggering edge of the output clock OC(K).

Each video router VR(K) for K=0, 1, 2, . . . , $N_R$-1 may also include a modification unit. The modification unit may be configured to receive the local stream LS(K) of video data words and to modify the local stream LS(K) to generate a modified stream MS(K) of video data words. The output interface may be configured to generate the stream $S_K$ by passing one video data word of the modified stream MS(K) onto the connecting bus CS(K) in response to each triggering edge of the output clock OC(K).

The modification unit may be configured to modify a subset of the video data words in the local stream LS(K) with a corresponding stream PX(K) of pixels. For example, the modification unit may be configured to modify the subset of video data words in the local stream LS(K) by replacing a pixel field in each video data word of the subset with a corresponding pixel in the pixel stream PX(K). The pixels of the pixel stream PX(K) may correspond to a $K^{th}$ region of a video frame or video field.

In one embodiment, the modification unit may be configured to modify the subset of video data words in the local stream LS(K) by blending a pixel field in each video data word of the subset with a corresponding pixel in the pixel stream PX(K).

Each video router VR(K), K=0, 1, 2, . . . , $N_R$-1, may also include a horizontal counter, a vertical counter, a set of horizontal boundary registers and a set of vertical boundary registers. The horizontal counter may receive the output clock OC(K), and increment in response to triggering edges of the output clock OC(K). In one embodiment, the vertical counter may increment in response to the value of the horizontal counter attaining a horizontal maximum value. The horizontal maximum value may define the end of horizontal lines.

As noted above, each video router VR(K), K=0, 1, 2, . . . , $N_R$-1, may further include a pixel modification unit. The pixel modification unit may be configured to modify the local stream LS(K) of video data words with pixels from the pixel stream PX(K) in response to (a) a horizontal count value of the horizontal counter falling interior to limits defined by the horizontal boundary registers, and (b) a vertical count value of the vertical counter falling interior to limits defined by the vertical boundary registers.

The video data words that are transported through the series of video routers may carry control information as well as pixel information. For example, each video data word may include a set of control fields such as a horizontal reset field and a vertical reset field. The first video router VR(0) may be programmably configured to embed control information in the control fields, and the succeeding video routers VR(1), VR(2), . . . , VR($N_R$-1) may be programmably configured to respond to the control information in the control fields.

In one set of embodiments, each video router VR(K), K=0, 1, 2, . . . , $N_R$-1, may be programmed to operate in a master mode or a slave mode. In the slave mode, a video router VR(K) may receive the stream $S_{K-1}$ from an upstream device, and operate on the local stream LS(K), i.e. the stream $S_{K-1}$ as it emerges from the link interface buffer, to generate the modified stream MS(K). The output interface may then transmit video data words of the modified stream onto the connecting bus CB(K), thus forming the output stream $S_K$. In the master mode, the video router VR(K) may ignore its upstream input port, internally generate a source stream of video data words, and operate on the source stream to generate the modified stream MS(K) of video data words. Again, the output interface sends the video data words of the modified stream MS(K) downstream, thus forming the stream $S_K$.

In one scenario, the first video router VR(0) may be programmed to operate in master mode, and the succeeding video routers VR(K), K=1, 2, . . . , $N_R$-1, may be programmed to operate in slave mode. In another scenario, all the video routers in the linear series may be programmed to operate in slave mode. In this case, each video router VR(K), K=0, 1, 2, . . . , $N_R$-1, may make successive modifications to the stream $S_{-1}$ presented as input to the first video router VR(0).

In a video router VR(K), K=0, 1, 2, . . . , $N_R$-1, programmed to operate in the master mode, the horizontal counter may reset to zero when its horizontal count value reaches a horizontal maximum value corresponding to the number of pixels in horizontal lines. The vertical counter may reset to zero when its vertical count value reaches a vertical maximum value corresponding to the number of lines in a frame (or field).

As indicated above, in master mode, a video router VR(K), K=0, 1, 2, . . . , $N_R$-1, may ignore the local stream path from the link interface buffer, and generate the modified stream MS(K) by internally originating a source stream of video data words and operating on the source stream. Furthermore, in master mode the video router VR(K) may embed a reset event in a horizontal reset field of a video data word of the modified stream MS(K) in response to the horizontal counter of the video router VR(K) attaining a "beginning of horizontal line" (BOHL) condition. For example, the BOHL condition may be defined by a horizontal count value of the horizontal counter attaining the value zero.

Furthermore, in the master mode the video router VR(K), K=0, 1, 2, . . . , $N_R$-1, may be configured to embed a reset event in a vertical reset field of a video data word of the modified stream MS(K) in response to the vertical counter of the video router VR(K) attaining a "beginning of frame/field" (BOFR) condition. For example, the BOFR condition may correspond to a horizontal count value of the horizontal counter equaling zero, and a vertical count value of the vertical counter equaling zero.

The horizontal counter in each video router VR(K), K=0, 1, 2, . . . , $N_R$-1, may be coupled so as to receive a horizontal reset field of each video data word of the local stream LS(K). In the slave mode, the horizontal counter may be configured to reset in response to a horizontal reset event occurring in the horizontal reset field. For example, the horizontal reset event may be defined by the horizontal reset field being equal to one (or zero, in an alternative embodiment).

In one embodiment, the vertical counter in each video router VR(K), K=0, 1, 2, . . . , $N_R$-1, may also be coupled so as to receive the horizontal reset field of each video data word of the local stream LS(K). In the slave mode, the vertical counter may increment in response to the reset event occurring in the horizontal reset field.

The vertical counter in each video router VR(K), K=0, 1, 2, . . . , $N_R$-1, may be coupled to so as to receive a vertical reset field of each video data word of the local stream LS(K). In the slave mode, the vertical counter may be configured to reset in response to a vertical reset event occurring in the vertical reset field. For example, the vertical reset event may be defined by the vertical reset field being equal to one (or zero, in an alternative embodiment). Thus, the master video router sets the video timing standard for a set of slave video routers by embedding control information in the video data words that are transmitted downstream.

As noted above, each video router VR(K), K=0, 1, 2, . . . , $N_R$-1, may include a modification unit. In addition, the video router VR(K) may include a pixel source unit (e.g. a letterbox color unit) configured to generate an initial source stream of video data words. The video data words of the initial stream may comprise pixels values. The pixel source unit may assign a programmable color value to the pixel values of the video data words of the source stream. In the master mode, a multiplexor device may be configured to direct the source stream (instead of the local stream LS(K) from the link interface buffer) to the modification unit, and the modification unit may be configured to modify the source stream to generate the modified stream MS(K) of video data pixels. The output interface of the video router VR(K) may be configured to transmit one video data word of the modified stream MS(K), in response to each triggering edge of the output clock OC(K), thus forming the output stream $S_K$.

The link interface buffer in each video router VR(K), K=0, 1, 2, . . . , $N_R$-1, may include a read pointer counter, a write pointer counter, and a buffer memory. The write counter may increment a write pointer in response to triggering edges of the synchronous clock SC(K-1). The read counter may increment a read pointer in response to triggering edges of the output clock OC(K). The write pointer determines write locations in the buffer memory for storing received video data words of the stream $S_{K-1}$. The read pointer determines read locations in the buffer memory for reading video data words from the buffer memory. The buffer memory may be an asynchronous register file.

The link interface buffer in each video router VR(K), K=0, 1, 2, . . . , $N_R$-1, may also include a synchronization circuit (also referred to herein as a synchronizer) configured to receive a first reset signal $RS_1(K)$ and to generate a second reset signal $RS_2(K)$ synchronized with the synchronous clock SC(K-1). The read pointer counter may be coupled to receive the first reset signal. The write pointer counter may be coupled to receive the second reset signal. The first reset signal may be synchronized with the output clock OC(K).

The write pointer may be initialized with an address value $N_W$, and the read pointer may be initialized with the address value $N_W-C_M/2-\Delta_{Synch}$, where $C_M$ is number of storage locations in the buffer memory allocated for storage of video data words, $\Delta_{Synch}$ is the number of clock periods of delay through the synchronization circuit.

More generally, the write pointer may be initialized with a value $N_W$, and the read pointer may be initialized with the value $N_W-\Delta$, wherein the value $\Delta$ is the greater than the number of clock periods of delay through the synchronization circuit. This condition guarantees that the read pointer does overrun the write pointer in the time interval between removal of reset from the read counter and removal of reset from the write counter.

An assertion of the first reset signal may induce clearing of a horizontal reset field and a vertical reset field of all video data words stored in the buffer memory. A de-assertion of the first reset signal may enable the read pointer counter to start counting, and after a time delay due to the synchronization circuit, enable the write pointer counter to start counting.

A host software driver executing on the host computer may be configured to control the de-assertion of the first reset signal in each video router VR(K) in sequential order starting from the first video router VR(0) through the last video router VR($N_R$-1).

Figure 18:
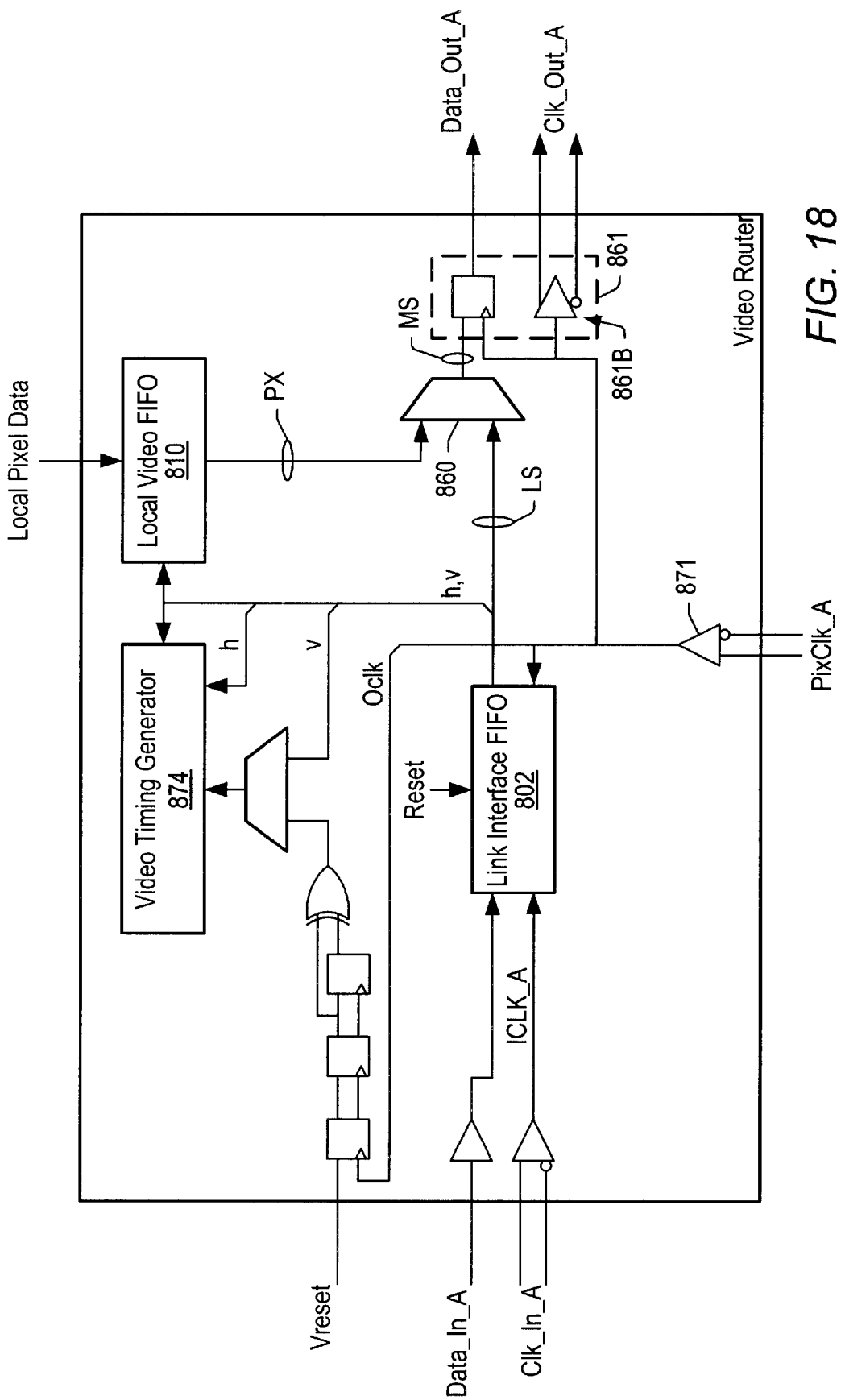
FIG. 18 illustrates one embodiment of a video router configured to support one video channel.

FIG. 18 illustrates one embodiment of the video router VR(K) for any K=0, 1, 2, . . . , $N_R$-1. The video router receives the source pixel clock PixClk_A from a clock generator. The source pixel clock may be buffered with a buffer 871 to generate an output clock Oclk. The output clock is supplied to the link interface FIFO 802 and output interface 861. The output clock drives read accesses from the link interface FIFO. It also drives the transmission of video data words from the output interface 861. The link interface FIFO 802 may receive a data bus Data_In_A and a synchronous clock signal Clk_In_A from a previous video router or from an external source such as a previous graphics board). The synchronous clock signal Clk_In_A is used to write video data words from the data bus Data_In_A into the link interface FIFO 802 (also referred to herein as a through-video FIFO). The read pointer and the write pointer of the link interface FIFO may be initialized so that they maintain a separation distance of approximately half the depth of the link interface FIFO. The video router may include buffers to buffer the data signal Data_In_A and synchronous clock signal Clk_In_A respectively. The buffered clock signal may be referred to as ICLK_A.

The various clock signals are illustrated in FIG. 18 as complementary clock signal pairs. However, in other embodiments, any or all of these clock signals may be single ended clock signals. In other words, it is not necessary to transmit a clock signal as a complementary pair. The same comment applies for the various clock signals described in FIGS. 19 and 20.

The video data words accessed from the link interface FIFO form a local stream LS which is supplied to multiplexor 860. Multiplexor 860 also receives video data words from a local video FIFO 810. The multiplexor 860 may modify a selected subset of the video data words of the local stream LS in response to control signals asserted by the video timing generator 874. The modified stream MS of video data words may be sent to output interface 861. Please refer to U.S. patent application Ser. No. 09/894,617 filed on Jun. 27, 2001, entitled "Flexible Video Architecture for Generating Video Streams" for more information on the configuration and operation of the video timing generator, the output interface 861 and the link interface FIFO 802.

The video timing generator includes a horizontal pixel counter, a vertical pixel counter and a region registers. The horizontal pixel counter may increment a horizontal count I in response triggering edges of the output clock Oclk. The vertical pixel counter may increment a vertical count J. For example, the vertical pixel counter may increment the vertical count J when the horizontal count reaches a maximum value corresponding to the end of a horizontal line. The video timing generator may be configured to assert a mix-control signal when the two-dimension pixel position (I,J) resides in a region defined by the region registers. The region registers may define the left, right, top and bottom boundaries of a region in a video frame (or video field).

A horizontal reset field and vertical reset field (denoted h and v respectively in FIG. 18) of the local stream LS are fed to the video timing generator. The value of the horizontal reset field and the value of the vertical reset field may be controlled by the video timing generator in the master video router of the linear series, e.g. video router VR(0). The master video router may control the insertion of a horizontal reset (e.g. a one value) in the horizontal reset field of a video data word at the beginning of each horizontal line as indicated by the value of its horizontal counter. Likewise, the video timing generator in the master video router may control the insertion of a vertical reset (e.g. a one value) in the vertical reset field of a video data word at the beginning of each frame (or field) as indicated by the value of its vertical counter.

Each video router VR(K) after the master video router may reset its horizontal counter in response to receiving the horizontal reset event (e.g. a one value) in the horizontal reset field, and may reset its vertical counter in response to receiving the vertical reset event (e.g. a one value) in the vertical reset field. Thus, the video timing generator in the master video router establishes the video timing standard for a group of slaved video routers downstream.

If the first video router VR(0) is programmed to operate in slave mode, the video timing is established by the control information (e.g. the horizontal and vertical reset events) embedded in the received stream $S_{-1}$.

The output interface 861 receives the modified stream MS of video data words from multiplexor 860 and generates an output data signal Data_Out_A. For example, the output interface 861 may include a parallel bank of flip-flops that are clocked with the output clock Oclk. The output interface also generates a synchronous clock Clk_Out_A that is transmitted along with the output data signal Data_Out_A to a destination such as a next video router. In the case of the last video router VR($N_R$-1), the output data signal may be transmitted to a digital-to-analog converter, or perhaps, to a next graphics board for further processing. The output interface may include a buffer 861B that receives the output clock Oclk and generates the synchronous clock Clk_Out_A and its complement from the output clock Oclk. The complementary clock pair may be sent along with the output data signal to the destination.

In one embodiment, the multiplexor 860 may be replaced with a blending unit that blends pixels from the local video FIFO with pixels in the local stream. In another embodiment, the multiplexor 860 may be replaced with a multi-function unit that may selectively blend or multiplex based on values in one or more configuration registers.

Figure 19:
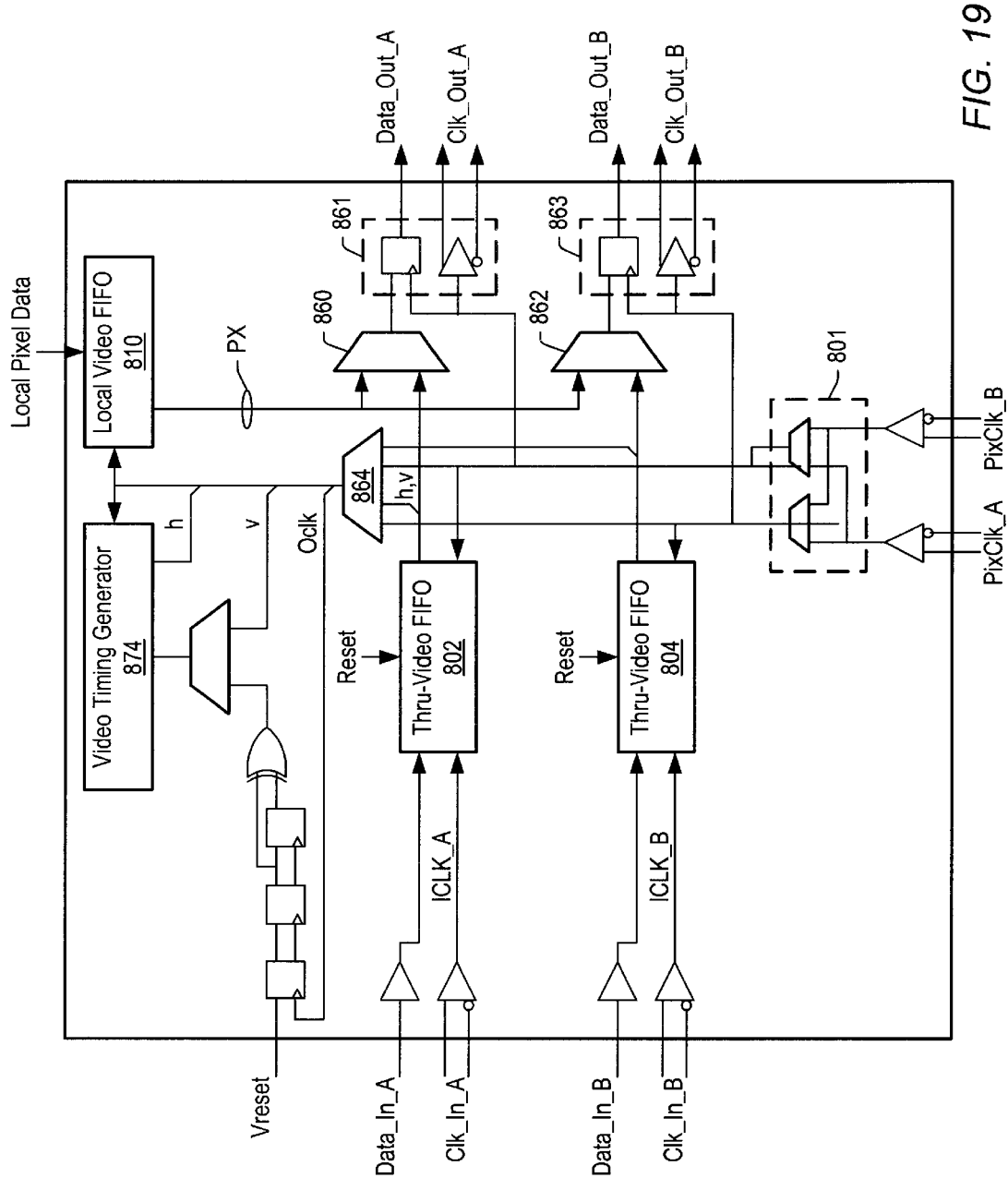
FIG. 19 illustrates another embodiment of a video router configured to support two video channels.

FIG. 19 illustrates another embodiment of the video router VR(K), K=0, 1, 2, . . . , $N_R$-1. In this embodiment, the video router includes two video channels A and B. Each video channel may individually operate similarly to the single video channel described in the embodiment of FIG. 18. The video router receives two pixel clocks PixClk_A and PixClk_B. The two pixel clocks may have different frequencies. Switching circuit 801 includes a pair of multiplexors and allows either clock to drive either through-video FIFO 802 or 804. Multiplexors 860 and 862 allow pixels from the local video FIFO 810 to be mixed (or substituted) into either video channel A and/or B in response to control signals asserted by the video timing generator 874. Multiplexor 864 selects between the horizontal and vertical resets of channel A or channel B. Please refer to U.S. patent application Ser. No. 09/894,617 filed on Jun. 27, 2001, entitled "Flexible Video Architecture for Generating Video Streams" for more description of this embodiment of the video router.

Figure 20:
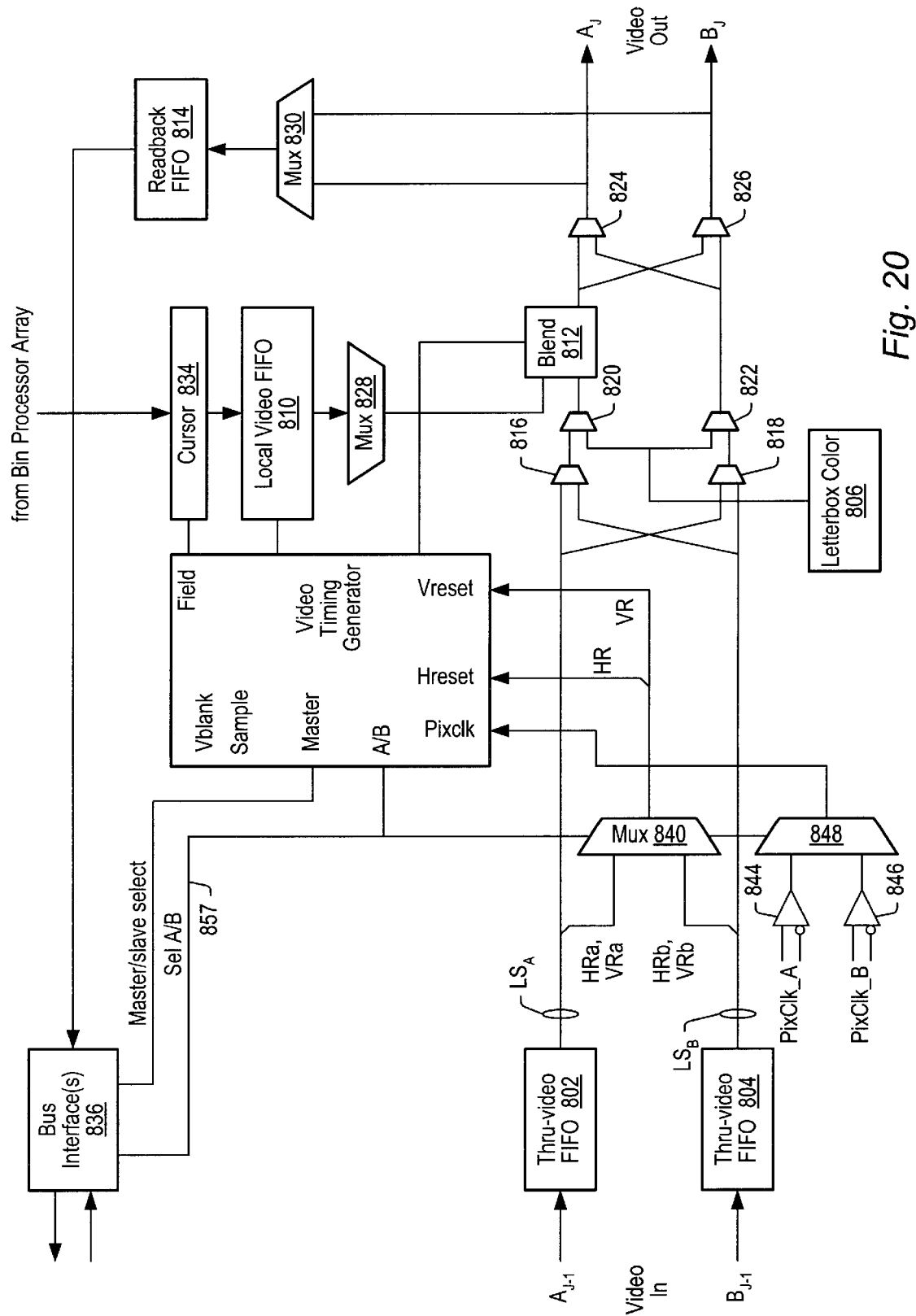
FIG. 20 illustrates yet another embodiment of a video router configured to support two video channels, where a selected one of the video channels interacts with a blend unit.

FIG. 20 illustrates yet another embodiment of the video router VR(K), K=0, 1, 2, . . . , $N_R-1$. In a master mode, the letterbox unit 806 may generate a source stream of dummy pixels with a programmably defined color. Multiplexors 820 and 822 allow the stream of dummy pixels (i.e. timing-placeholder pixels) to be sent to the blend unit 812 or to bypass the blend unit 812. In a slave mode, the multiplexors 820 and 822 may select their inputs not connected to the letterbox unit 806.

Multiplexors 816 and 818 allow either the output stream $LS_A$ from through-video FIFO 802 or the output stream $LS_B$ from through-video FIFO 804 to be sent to the blend unit 812. Thus, one of the streams may experience the blending interaction in blend unit 812, and the other stream may be passed through the video router without modification. This selection may be programmably determined. Blend unit 812 may mix (or substitute) pixels from the local video FIFO 810 into the stream from the selected through-video FIFO. Please refer to U.S. patent application Ser. No. 09/894,617.

Figure 21:
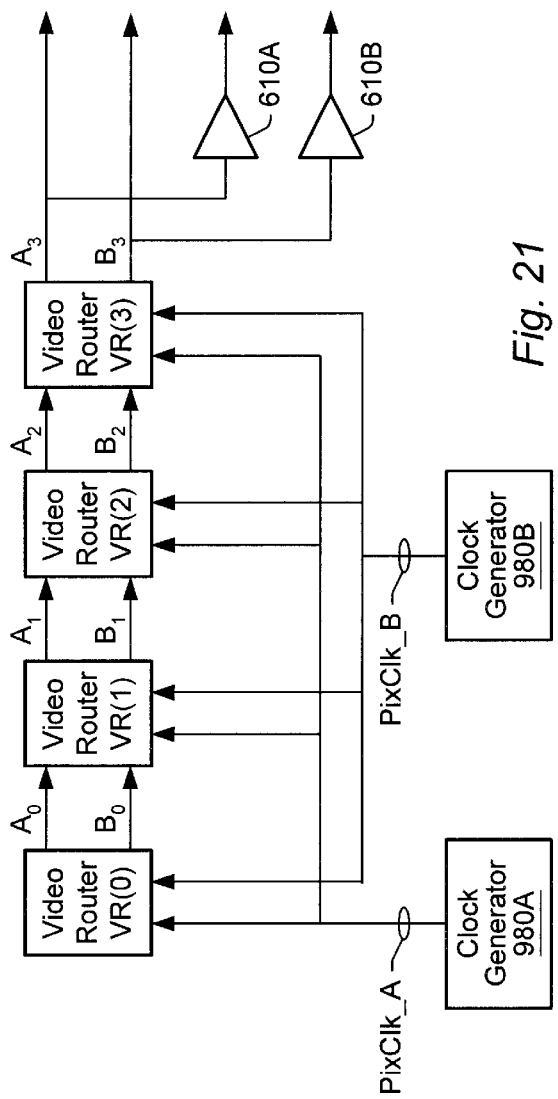
FIG. 21 illustrates a liner series of video routers each coupled to pixel clocks 980A and 980B.

A first pixel clock signal denoted as PixClk_A and a second pixel clock signal denoted as PixClk_B may be distributed to each video router VR(K), K=0, 1, 2, . . . , $N_R-1$, of the linear series as suggested by FIG. 21 in the case $N_R=4$. A clock generator 980A generates the pixel clock signal PixClk_A, and a clock generator 980B generates the pixel clock PixClk_B. The two pixel clock signals may have different frequencies. Each video router VR(K), K=0, 1, 2, . . . , $N_R-1$, may include buffers 844 and 846 as illustrated in FIG. 20 to buffer the pixel clocks.

In each video router VR(K), K=0, 1, 2, . . . , $N_R-1$, multiplexor 848 may be programmably configured to select one of the buffered clock signals, transmitted from buffers 844 and 846. The selected clock may be used to drive the video timing generator and to drive read accesses from one of the though-video FIFOs, i.e. the through-video FIFO whose output stream LS is destined to interact with blend unit 812.

Multiplexor 848 may be paired with a second multiplexor in a switching circuit as suggested by the crossbar circuit 801 of FIG. 19. The second multiplexor may be configured to make the opposite selection as multiplexor 848 from among the buffered clock signals. The buffered clock signal selected by the second multiplexor may be used to drive read accesses from the through-video FIFO whose output stream is destined to miss the blend unit 812.

The video routers of the linear series may be embedded in corresponding filtering units of graphics accelerator 100. Each video router may be assigned to video group A or video group B. The video routers in video group A may mix their local pixels into the video stream A. The video routers in video group B may mix their local pixels into video stream B. This set of embodiments is described in more detail in U.S. patent application Ser. No. 09/894,617.

Figure 22A:
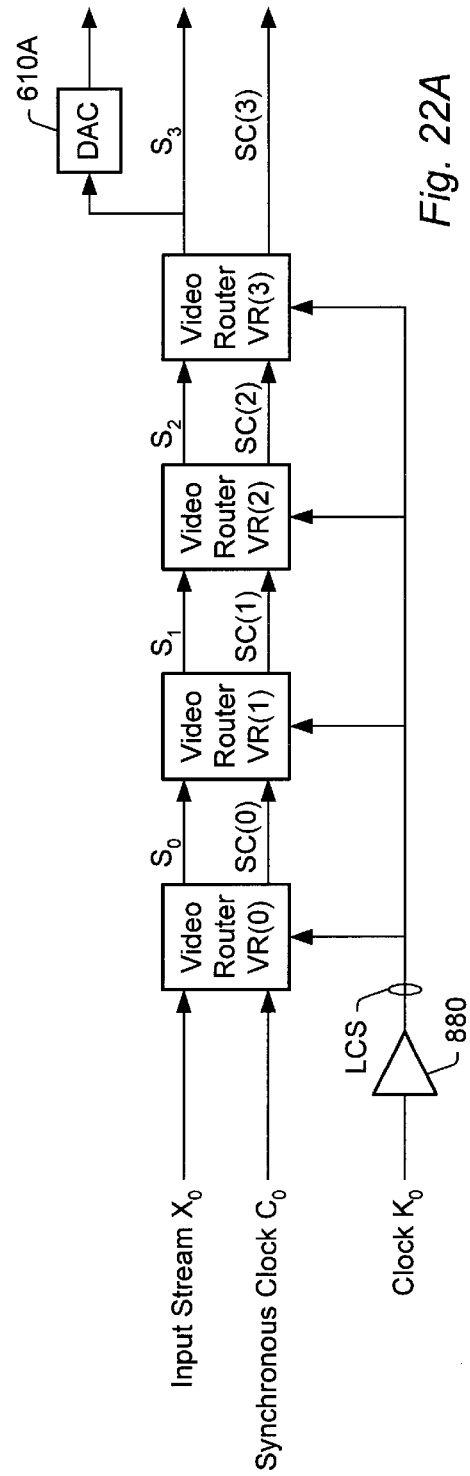
FIG. 22A illustrates a linear series of video routers supplied with a local clock signal which is derived by buffering an input clock $K_0$.

In one set of embodiments, the first video router VR(0) may be configured to receive an input stream $X_0$ of video data words, a synchronous clock signal $C_0$, and a clock $K_0$ having the same frequency as synchronous clock $C_0$ as suggested by FIG. 22A in the $N_R=4$ case. The clock signal $K_0$ may be supplied to a buffer 880. (A clock signal X is said to be isochronous to clock signal Y if X has the same frequency as Y.) The output of buffer 880 is referred to as the local clock signal LCS. Buffer 880 may be realized by any of a variety of buffer devices or PLL (phase lock loop) buffer devices. The local clock signal LCS may be distributed to each of the video routers in the linear series. In each video router VR(K), the local clock signal LCS may be buffered again to generate the output clock OC(K) that drives read accesses from the link interface buffer (i.e. through-video FIFO) and drives the video timing generator.

The link interface buffer in video router VR(0) may be configured to receive and internally store one of the video data words of the input stream $X_0$ in response to each triggering edge of the synchronous clock $C_0$. The link interface buffer may be configured to generate the local stream LS(0) by accessing one of the internally stored video data words in response to each triggering edge of the output clock OC(0).

Each of the video routers in the linear series may be configured to operate in slave mode. Thus, the video timing generator in each video router VR(K) is responsive to timing control information (e.g. the horizontal and vertical resets) embedded in the video data words of the input stream $X_0$.

Figure 22B:
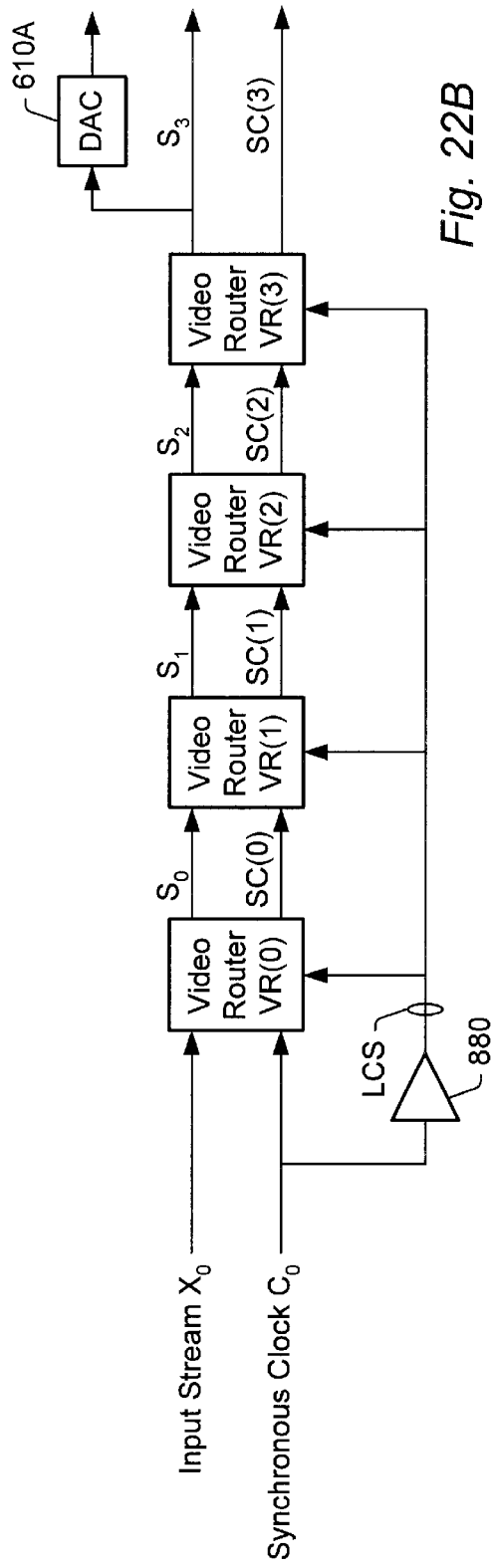
FIG. 22B illustrates a linear series of video routers supplied with a local clock signal which is derived by buffering a clock signal $C_0$ which is synchronous with respect to an input data stream $X_0$.

FIG. 22B illustrates an alternative to the embodiment of FIG. 22A. In this alternative embodiment, the synchronous clock $C_0$ is supplied to buffer 880 instead of the clock signal $K_0$. Thus, the clock signal $K_0$ is not needed.

Figure 22C:
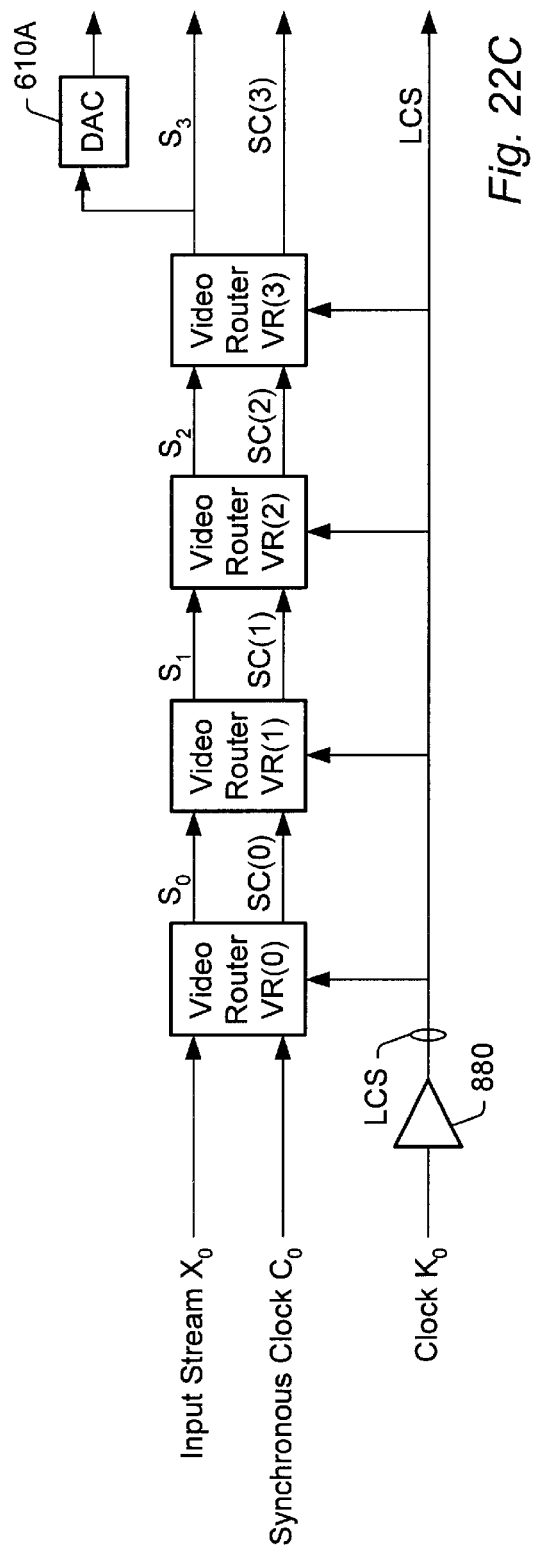
FIG. 22C illustrates a linear series of video routers supplied with a local clock signal which is derived by buffering a clock signal $C_0$ which is synchronous with respect to an input data stream $X_0$.

FIG. 22C illustrates another alternative to the embodiment of FIG. 22A. In this alternative embodiment, the local clock signal LCS is provided as an output. The local clock signal may be used as the $K_0$ input for another series of video routers (e.g. in another graphics accelerator).

As noted above, the linear series of video routers VR(K), K=0, 1, 2, . . . , $N_R-1$, may be incorporated in a graphics system such as graphics accelerator 100. In one set of embodiments, multiple copies of graphics accelerator 100 may be coupled together in a linear chain. Thus, the input stream $X_0$ and synchronous clock $C_0$ may be generated by a previous graphics accelerator of the linear chain. Furthermore, the stream $S_{NR-1}$ and synchronous clock $SC(N_R-1)$ generated by the last video router $VR(N_R-1)$ may be transmitted to a next graphics accelerator in the linear chain. Thus, a set of graphics accelerators may partition the effort of generating one or more video streams.

Figure 23:
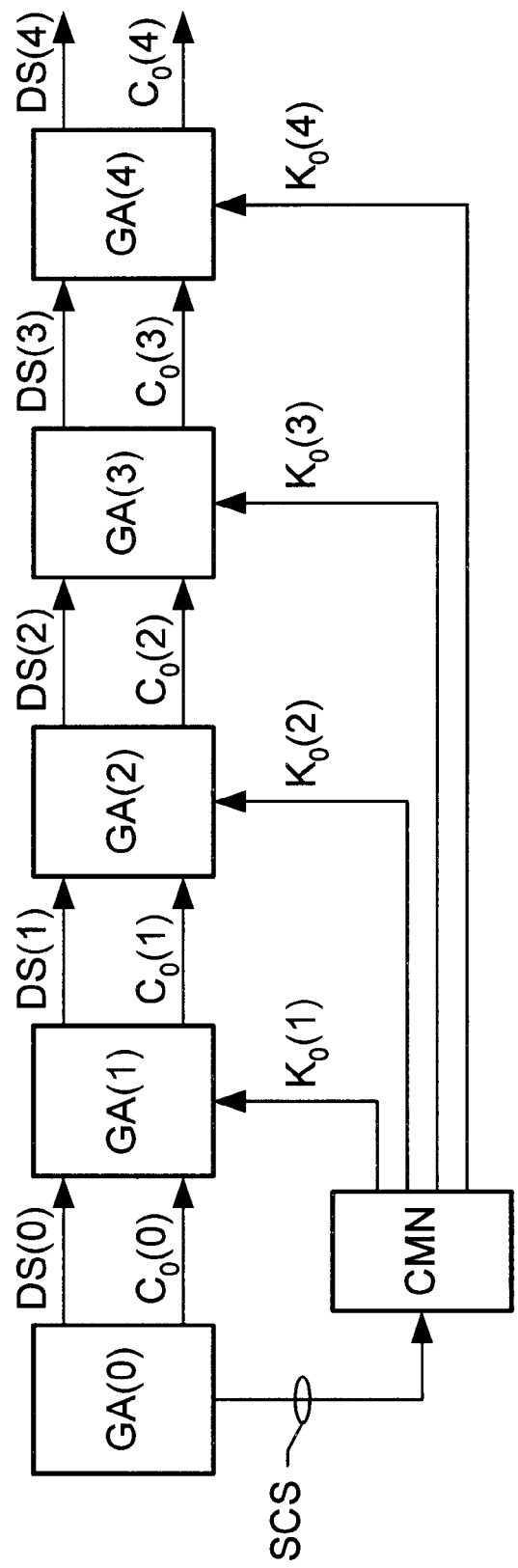
FIG. 23 illustrates a linear chain of graphics accelerators and a clock multiplication network.

In one set of embodiments, $N_{GA}$ graphics accelerators denoted GA(0), GA(1), . . . , $GA(N_{GA}-1)$ may be coupled together in a linear chain, where $N_{GA}$ is an integer greater than or equal to two. The case $N_{GA}=4$ is illustrated in FIG. 23. Each graphics accelerator GA(J), J=0, 1, 2, . . . , $N_{GA}-1$, may include a linear series of video routers as described variously above. The last video router in each graphics accelerator GA(J), J=0, 1, 2, . . . , $N_{GB}-2$, may send its output stream denoted DS(J) and the corresponding synchronous clock denoted $C_0(J)$ to the next graphics accelerator GA(J+1). The first video router in each graphics accelerator GA(J), J=1, 2, . . . , $N_{GA}-1$, may receive the stream DS(J-1) and the corresponding synchronous clock $C_0(J-1)$ from the previous graphics accelerator GA(J-1). Thus, video routers in the $N_{GA}$ graphics accelerators are joined together to form a linear super-series. The first video router in the first graphics accelerator GA(0) may be programmed to operate in master mode, and the remaining video routers in the super-series may be programmed to operate in slave mode. (In some embodiments, the video routers may be configured as described above in connection with FIG. 20. In this case, the first video router in the super-series may be programmed to operate as the master for video group A. Another video router in the super-series may be programmed to operate as the master for video group B. Please refer to U.S. patent application Ser. No. 09/894,617 for more description of these embodiments.)

The video routers in the first graphics accelerator GA(0) may be programmed to operate in response to a source clock signal SCS generated by a clock generator internal to the first graphics accelerator GA(0) as described variously above. Thus, the synchronous clock signal $C_0(0)$ transmitted from the last video router of the first graphics accelerator GA(0) has the same frequency as the source clock signal SCS.

In one set of embodiments, the first graphics accelerator may be configured to provide the source clock signal SCS to a clock output port. The clock output port may couple to an external clock multiplication network CMN as shown in FIG. 23. The clock multiplication network may include a tree of buffer devices.

Figure 24:
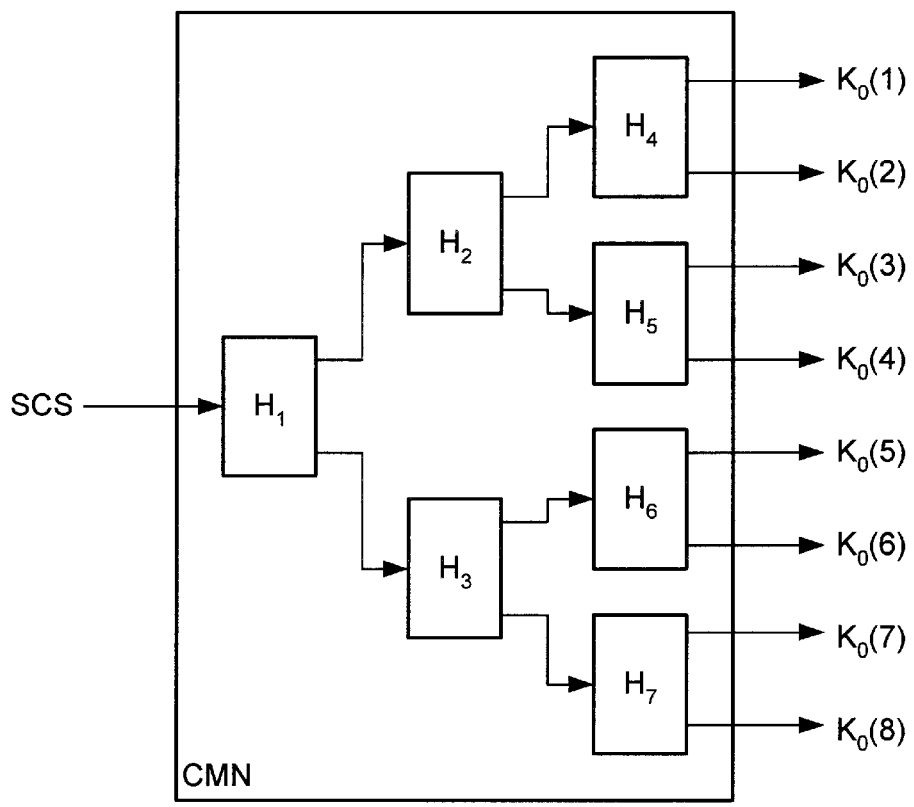
FIG. 24 illustrates one embodiment of a binary tree of buffers for implementing the clock multiplication network.

A first stage of the buffer tree may include a single buffer with one input line and $M_1$ output lines. The second stage may include $M_1$ buffers each with one input and $M_2$ outputs. The input line of each buffer in the second stage may couple to a corresponding output of the first-stage buffer. The third stage may include $M_1*M_2$ buffers each having one input and $M_3$ outputs. The input line of each buffer in the third stage may couple to a corresponding one of the $M_1*M_2$ outputs of the second stage. The third stage generates $M_1*M_2*M_3$ outputs. A buffer tree constructed in this fashion has $N_{BT}=M_1*M_2* \ldots *M_R$ outputs, where R is the number of stages, and $M_K$ is the fan out of the buffer devices in stage K. The case R=3 and $M=M_1=M_2=M_3=2$ is illustrated in FIG. 24 with a tree of single-input two-output buffers $H_1, H_2, \ldots, H_7$.

If each $M_K$ equals a common value M, it follows that $N_{BT}=M^R$. Observe that the number $N_{BT}$ grows very rapidly with respect to M and R. For example, if M=8 and R equals two, $N_{BT}=64$. Thus, the buffer tree would provide 64 output clocks. Each of the output clocks has the same frequency as the source clock signal SCS.

The outputs $K_0(1), K_0(2), \ldots, K_0(N_{BT})$ of the buffer tree may be used to drive the $K_0$ clock input of the second and succeeding graphics accelerators GA(1), GA(2), ..., GA($N_{GA}$-1) as suggested by FIG. 23. Each of the second and succeeding graphics accelerators may use a corresponding output clock $K_0(J)$ as suggested above in the discussion of FIG. 22A.

In one alternative embodiment, each graphics accelerator GA(J) in the linear chain of graphics accelerators may use the configuration illustrated in FIG. 22B. In this case, the local clock signal LCS in each graphics accelerator GA(J), J=1, 2, ..., $N_{GA}$-1, is generated from the synchronous clock signal $C_0(J-1)$ received from the previous graphics accelerator GA(J-1), and the clock multiplication network is not needed. However, observe that the synchronous clock $C_0(J-1)$ received at the input of graphics accelerator GA(J) will carry the accumulated effect of having sent the source clock signal of the first graphics accelerator through a number of buffers which is roughly proportional to the quantity (J-1). The buffers 880 in the graphics accelerators GA(1), GA(2), ..., GA(J-1), and buffers such as buffers 871 and 861B in the last video router of each graphic accelerator GA(0), GA(1), GA(2), ..., GA(J-1) intervene between the source clock signal SCS and the synchronous clock $C_0(J-1)$. Because the duty cycle of a clock signal may increase in passing through a buffer, a larger number of buffer traversals may increase the duty cycle to such an extent that the resulting clock signal is unusable. Thus, in this embodiment, a limitation may be imposed on the number $N_{GA}$ of graphics accelerators in the linear chain to guarantee usable clock signals everywhere in the linear chain.

In another alternative embodiment, each graphics accelerator GA(J) in the linear chain of graphics accelerators may use the configuration illustrated in FIG. 22C. In this case, the local clock signal LCS in each graphics accelerator GA(J), J=1, 2, ..., $N_{GA}$-1, is generated from the clock signal $K_0(J-1)$ received from the previous graphics accelerator GA(J-1), and the clock multiplication network is not needed. However, observe that the clock signal $K_0(J-1)$ received at the input of the graphics accelerator GA(J) will carry the accumulated effect of having traversed a number of buffers which is roughly proportional to the quantity (J-1). Thus, in this embodiment also, a limitation may be imposed on the number $N_{GA}$ of graphics accelerators in the linear chain to guarantee usable clock signals everywhere in the linear chain.

The embodiment of FIG. 23 avoids the proportional growth in the number of clock buffer traversals by sending the source clock signal through a clock multiplication network which has a tree structure, and directly transferring the resulting output clock signals to the respective graphics accelerators. The tree structure implies that the number of buffer traversals between the source clock signal SCS and the output clocks equals the number R of stages in the buffer tree. The number R of stages varies logarithmically with respect to the number $N_{BT}$ of output clocks. In the case where the tree is constructed from buffers having fanout M, the number of stages $R=\log_M(N_{BT})$. Thus, the embodiment of FIG. 23 may support a significantly larger number $N_{GA}$ of graphics accelerators in the linear chain without significant degradation of clock signal quality.

Reset Protocol

Figure 25:
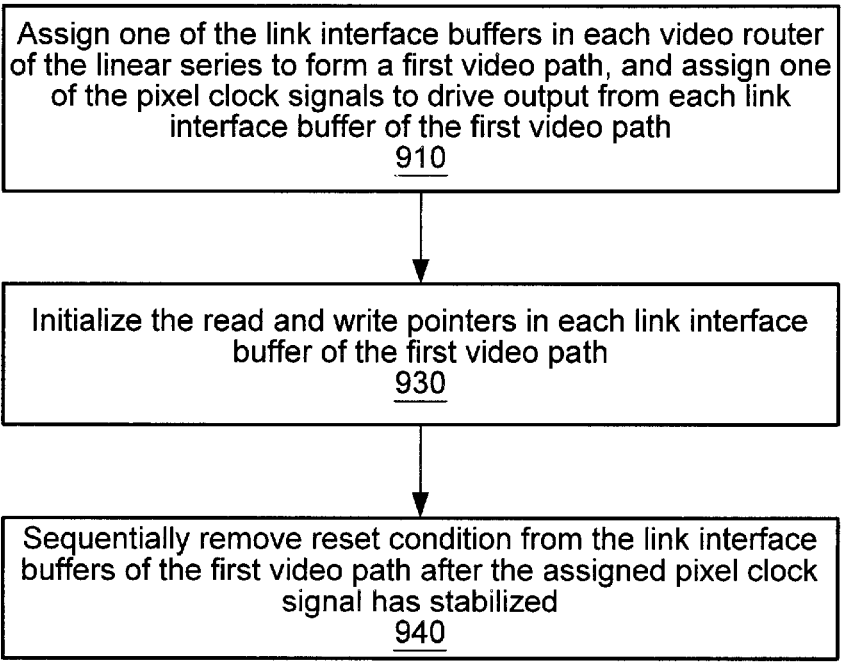
FIG. 25 illustrates one embodiment of a method for initializing the linear series of video routers.

In one set of embodiments, a method for initializing the linear series of video routers may be configured as illustrated in FIG. 25.

In step 910, a host software routine (i.e. a configuration routine executing on the host computer) assigns one of the link interface buffers in each video router of the linear series to form a first video path for a first video stream. This assignment may be achieved by writing to one or more configuration registers in each video router. The configuration registers may determine the selection state of multiplexors such as multiplexors 816, 818, 824 and 826.

A video path is the path along which a video stream flows as it passes through the linear series of video routers or a subset thereof. Thus, a video path may include a series of elements such as link interface buffers, multiplexors, output interfaces and/or blend units.

Furthermore, the host software routine may assign one of a plurality of pixel clock signals to drive the output from the link interface buffers of the first video path. This assignment may be achieved by writing to one or more configuration registers in each video router. The configuration registers may determine the selection state of clock routing multiplexors such as multiplexors 801 of FIG. 19 and multiplexor 848 of FIG. 20. The inputs of the link interface buffers of the first video path are driven as described above by source synchronous clocks derived from the assigned pixel clock signal.

In step 930, the host software routine may initialize the read and write pointers of the selected link interface buffer in each video router of the first video path. The pointers may be initialized as described above. For example, the read and write pointers of the selected link interface may be initialized so as to have an address separation that is approximately half the capacity of the selected link interface buffer. See the discussion above dealing with pointer initialization.

In step 940, the host software routine may command the sequential removal of a reset condition from the link interface buffers of the first video path starting from the first video router of the linear series. The sequential removal is started after the selected pixel clock signal has stabilized.

The sequential removal of the reset condition may be achieved by sending a global reset removal command to the linear series of video routers through a segmented communication bus. The segmented communication bus may have a first segment 700A (as illustrated in FIG. 1) that couples to the first video router of the linear series, and intermediate segments that couple between successive ones of the video routers in the linear series. Thus, as the global command propagates through the linear series of video routers on the segmented communication bus, the sequential ordering of reset removal is achieved automatically. Each video router of the linear series removes the reset condition from its link interface buffers in response to receiving the global reset command from the segmented communication bus.

Please refer to U.S. patent application Ser. No. 09/894,068, filed on Jun. 28, 2001, entitled "GRAPHICS SYSTEM WITH REAL-TIME CONVOLVED PIXEL READBACK", invented by Michael F. Deering and Nathaniel D. Naegle, for more information on the construction and use of a segmented communication bus. This patent application is hereby incorporated by reference in its entirety.

The host software routine may program the first video router VR(0) of the linear series to operate in the master mode for the first video path prior to the sequential removal of the reset condition from the link interface buffers of the first video path. Thus, the video timing generator in the first video router VR(0) may determine video stream timing in the first video path.

In some embodiments, the host software routine may select a video router VR(L) from the video routers VR(K), K=1, 2, . . . , $N_R$−1, to be a master for the second video group. The host software routine may select a second one of the link interface buffers in each video router VR(K), K=L, L+1, L+2, . . . , $N_R$−1, to form a second video path. Note that for video routers configured to support up to two video streams, the selection of the link interface buffers for the first path implicitly specifies the link interface buffers of the second video path as the second path selections are the complement of the first path selections. Thus, an independent set of selections for the link interface buffers of the second video path may not be necessary in certain embodiments.

The host software routine may assign a second one of the plurality of pixel clock signals to drive the output of the link interface buffers of the second video path, and may initialize read and write pointers of the second selected link interface buffer in each video router of the second video path. Then, the host software routine may sequentially remove the reset condition from the link interface buffers of the second video path starting from the first video router of the second video path. The sequential removal is started after the second selected pixel clock signal has stabilized.

It is noted that the second set of selections for the second video path and the second pixel clock signal may be performed in parallel with the first set of selections described above.

In various embodiments described herein, data is valid every cycle of the assigned pixel clock on the input and output buses to/from the link interface buffers. Video timing signals are carried in the data stream transported through the input and output buses. Video timing for each video group is determined by the master video timing generator of the video group.

Numerous variations and modifications will become apparent to those skilled in the art once the above disclosure is fully appreciated. It is intended that the following claims be interpreted to embrace all such variations and modifications.

What is claimed is:

1. A method for initializing a linear series of video routers, wherein each video router includes a plurality of link interface buffers, the method comprising:
   programmatically selecting one of the link interface buffers in each video router of the linear series to form a first video path;
   programmatically selecting one of a plurality of pixel clock signals to drive output from the link interface buffers of the first video path;
   initializing read and write pointers of the selected link interface buffer in each video router of the first video path;
   sequentially removing a reset condition from the link interface buffers of the first video path starting from the first video router of the linear series, wherein the sequential removing is started after the selected pixel clock signal has stabilized.

2. The method of claim 1 further comprising programmatically configuring the first video router of the linear series to operate as a master for video stream timing in the first video path prior to the sequentially removing the reset condition.

3. The method of claim 1, wherein the read and write pointer of the selected link interface are initialized so as to have an address separation that is approximately half the capacity of the selected link interface buffer.

4. The method of claim 1, wherein the sequentially removing the reset condition comprises sending a global reset removal command to the linear series of video routers through a segmented communication bus which has a first segment that couples to the first video router of the linear series, and intermediate segments that couple between successive ones of the video routers in the linear series, wherein each video router of the linear series removes the reset condition from its link interface buffers in response to receiving the global reset removal command from the segmented communication bus.

5. The method of claim 1 further comprising:
   programmatically selecting a second one of the link interface buffers in each video router after an $L^{th}$ video router of the linear series to form a second video path;
   programmatically selecting a second one of the plurality of pixel clock signals to drive the link interface buffers of the second video path;
   initializing read and write pointers of the second selected link interface buffer in each video router of the second video path;
   sequentially removing a reset condition from the link interface buffers of the second video path starting from the first video router of the second video path, wherein the sequential removing is started after the second selected pixel clock signal has stabilized.

6. The method of claim 1 further comprising programmatically initiating a reset condition in each of the video routers of the linear series prior to said initializing the read and write pointers of the selected link interface buffers.

7. The method of claim 1, wherein each video router of the linear series resides within a corresponding filtering unit, wherein each filtering unit is programmable to filter samples to generate pixels.

8. The method of claim 1, wherein a first subset of the filtering units are configured to generate pixels for a first video stream which flows through the link interface buffers of the first video path.

9. The method of claim 8, wherein each filtering unit of the first subset is configured to compute pixels for a programmably defined subset of pixels in the first video stream.

10. The method of claim 1, wherein each video router of the linear series is configured to buffer the selected pixel clock signal, to read video data words from the selected link interface buffer in response to the buffered clock signal.

11. The method of claim 10, wherein each video router of the linear series, prior to the last video router is configured to buffer the buffered clock signal, and to transfer an output video stream to the selected link interface buffer of the next video router along with the doubly buffered clock signal, wherein the selected link interface buffer of the next video router receives video data words of the output stream based on the double buffered clock signal.

* * * * *